US009037612B2

(12) United States Patent
Zha et al.

(10) Patent No.: US 9,037,612 B2
(45) Date of Patent: May 19, 2015

(54) DATACENTER WORKFLOW AUTOMATION SCENARIOS USING VIRTUAL DATABASES

(71) Applicant: Delphix Corp., Menlo Park, CA (US)

(72) Inventors: Charlie Li Zha, Palo Alto, CA (US); Jedidiah Yueh, Menlo Park, CA (US); Alok Kumar Srivastava, Newark, CA (US)

(73) Assignee: Delphix Corp., Menlo Park, CA (US)

( * ) Notice: Subject to any disclaimer, the term of this patent is extended or adjusted under 35 U.S.C. 154(b) by 0 days.

(21) Appl. No.: 14/058,873

(22) Filed: Oct. 21, 2013

(65) Prior Publication Data

US 2014/0052693 A1 Feb. 20, 2014

Related U.S. Application Data

(63) Continuation of application No. 13/316,263, filed on Dec. 9, 2011, now Pat. No. 8,566,361, which is a continuation of application No. 12/603,545, filed on Oct. 21, 2009, now Pat. No. 8,161,077.

(51) Int. Cl.
    *G06F 17/30* (2006.01)
(52) U.S. Cl.
    CPC .... *G06F 17/30088* (2013.01); *G06F 17/30592* (2013.01)
(58) Field of Classification Search
    None
    See application file for complete search history.

(56) References Cited

U.S. PATENT DOCUMENTS

| 4,853,843 A * | 8/1989 | Ecklund ............................ 1/1 |
| 5,634,053 A | 5/1997 | Noble et al. |
| 5,680,608 A | 10/1997 | Chang et al. |
| 5,819,292 A | 10/1998 | Hitz et al. |
| 6,523,036 B1 | 2/2003 | Hickman |
| 6,883,083 B1 | 4/2005 | Kemkar |
| 6,920,457 B2 | 7/2005 | Pressmar |
| 7,107,385 B2 | 9/2006 | Rajan et al. |
| 7,197,491 B1 | 3/2007 | Chou et al. |
| 7,225,204 B2 | 5/2007 | Manley et al. |

(Continued)

FOREIGN PATENT DOCUMENTS

| CN | 101473309 A | 7/2009 |
| JP | 2004-110218 | 4/2004 |
| JP | 2009-530756 | 8/2009 |

OTHER PUBLICATIONS

Pan et al, "A Virtual Database Management System For the Internet", 2002.*

(Continued)

*Primary Examiner* — Hung Le
(74) *Attorney, Agent, or Firm* — Fenwick & West, LLP

(57) ABSTRACT

Information from multiple databases is retrieved and stored on a database storage system. Multiple point-in-time copies are obtained for each database. A point-in-time copy retrieves data changed in the database since the retrieval of a previous point-in-time copy. A virtual database (VDB) is created by creating a set of files in the data storage system. Each file in the set of files created for a VDB is linked to the database blocks on the database storage system associated with a point-in-time copy of the source database. The set of files associated with the VDB are mounted on a database server allowing the database server to read from and write to the set of files. Workflows based on VDBs allow various usage scenarios based on databases to be implemented efficiently, for example, testing and development, backup and recovery, and data warehouse building.

20 Claims, 25 Drawing Sheets

(56) References Cited

U.S. PATENT DOCUMENTS

| | | | |
|---|---|---|---|
| 7,269,607 B2 * | 9/2007 | Cotner et al. | 1/1 |
| 7,334,094 B2 | 2/2008 | Fair | |
| 7,334,095 B1 | 2/2008 | Fair et al. | |
| 7,373,364 B1 | 5/2008 | Chapman | |
| 7,386,695 B2 | 6/2008 | Fuente | |
| 7,409,511 B2 | 8/2008 | Edwards et al. | |
| 7,457,982 B2 | 11/2008 | Rajan | |
| 7,539,836 B1 | 5/2009 | Klinkner | |
| 7,587,563 B1 | 9/2009 | Teterin et al. | |
| 7,590,660 B1 | 9/2009 | Richards et al. | |
| 7,631,021 B2 | 12/2009 | Sarma et al. | |
| 7,653,794 B2 * | 1/2010 | Michael et al. | 711/162 |
| 7,743,035 B2 | 6/2010 | Chen et al. | |
| 7,757,056 B1 | 7/2010 | Fair | |
| 7,779,051 B2 * | 8/2010 | Friedlander et al. | 707/810 |
| 7,809,769 B2 | 10/2010 | Butcher et al. | |
| 7,822,758 B1 | 10/2010 | Prakash et al. | |
| 7,827,366 B1 | 11/2010 | Nadathur et al. | |
| 7,856,424 B2 | 12/2010 | Cisler et al. | |
| 7,877,357 B1 | 1/2011 | Wu et al. | |
| 7,895,228 B2 | 2/2011 | Cragun et al. | |
| 7,937,547 B2 | 5/2011 | Liu et al. | |
| 7,941,470 B2 | 5/2011 | Le et al. | |
| 7,996,636 B1 | 8/2011 | Prakash et al. | |
| 8,037,032 B2 | 10/2011 | Pershin et al. | |
| 8,150,808 B2 | 4/2012 | Zha et al. | |
| 8,255,915 B1 | 8/2012 | Blanding et al. | |
| 8,280,858 B2 | 10/2012 | Ahrens et al. | |
| 8,311,988 B2 | 11/2012 | Cisler et al. | |
| 8,532,973 B1 | 9/2013 | CaraDonna et al. | |
| 8,775,663 B1 | 7/2014 | Singh | |
| 2002/0083037 A1 | 6/2002 | Lewis et al. | |
| 2002/0143764 A1 * | 10/2002 | Martin et al. | 707/8 |
| 2003/0204597 A1 * | 10/2003 | Arakawa et al. | 709/226 |
| 2004/0054648 A1 | 3/2004 | Mogi et al. | |
| 2005/0114701 A1 | 5/2005 | Atkins et al. | |
| 2007/0219959 A1 | 9/2007 | Kanemasa | |
| 2007/0294215 A1 | 12/2007 | Boss et al. | |
| 2008/0183973 A1 * | 7/2008 | Aguilera et al. | 711/147 |
| 2008/0256314 A1 * | 10/2008 | Anand et al. | 711/162 |
| 2008/0306904 A1 | 12/2008 | Fukuda et al. | |
| 2008/0307345 A1 | 12/2008 | Hart et al. | |
| 2009/0080398 A1 | 3/2009 | Mahany et al. | |
| 2009/0132611 A1 | 5/2009 | Brown et al. | |
| 2009/0144224 A1 | 6/2009 | Phan et al. | |
| 2009/0177697 A1 * | 7/2009 | Gao et al. | 707/104.1 |
| 2009/0222496 A1 | 9/2009 | Liu et al. | |
| 2009/0292734 A1 | 11/2009 | Miloushev et al. | |
| 2010/0125844 A1 | 5/2010 | Mousseau et al. | |
| 2010/0131959 A1 | 5/2010 | Spiers et al. | |
| 2010/0174684 A1 | 7/2010 | Schwaab | |
| 2011/0004586 A1 * | 1/2011 | Cherryholmes et al. | 707/682 |

OTHER PUBLICATIONS

Office Action for Australian Patent Application No. AU 2010310828, Mar. 17, 2014, 3 Pages.
Office Action for Australian Patent Application No. AU 2010310827, Mar. 20, 2014, 3 Pages.
Office Action for Chinese Patent Application No. CN 201080058431.3, May 7, 2014, 24 Pages.
Office Action for U.S. Appl. No. 13/329,132, Apr. 14, 2014, 9 Pages.
Office Action for U.S. Appl. No. 12/647,337, Jun. 10, 2014, 10 Pages.
Boppana, U., "Using FlexClone to Clone Files and LUNs," NetApp Technical Report, Mar. 2010, 32 Pages.
Creek, T., "Applications for Writeable LUNs and LUN Cloning in Oracle Environments," NetApp, Technical Report, Jun. 2003, 10 Pages.
Degwekar, A., "Using SnapMirror with SnapDrive for UNIX," NetApp Technical Report, 2007, 11 Pages.
Gmane, Discussion regarding "File level snapshots in ZFS," From the zfs-discuss@opensolaris.org mailing list, Mar. 30, 2007, 1 Page, Can be retrieved at <URL:http://article.gmane.org/gmane.os.solaris.openolaris.zfs/7759/match=snapshot>.
Gmane, Discussion regarding "ZFS Clone Promotion [PSARC/2006/303 Timeout: May 12, 2006]," From the zfs-discuss@opensolaris.org mailing list, May 9, 2006, 2 Pages, Can be retrieved at <URL:http://article.gmane.org/gmane.os.solaris.opensolaris.zfs/194/match=clone>.
Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/224/match=cloning>.
Gmane, Discussion regarding "ZFS Clone Promotion [PSARC/2006/303 Timeout: May 12, 2006]," From the zfs-discuss@opensolaris.org mailing list, May 10, 2006, 1 Page, Can be retrieved at <URL:http://article.gmane.org/gmane.os.solaris.opensolaris.zfs/229/match=zfs+clone+promotion>.
Gmane, Discussion regarding "ZFS snapshot improvement," From the zfs-discuss@opensolaris.org mailing list, May 10, 2006, 1 Page, Can be retrieved at <URL:http://article.gmane.org/gmane.os.solaris.open olaris.zfs/232/match=snapshot>.
Gmane, Discussion regarding "ZFS promotions," From the zfs-discuss@opensolaris.org mailing list, Dec. 12, 2008, 2 Pages, Can be retrieved at <URL:http://article.gmane.org/gmane.os.solaris.openolaris.zfs/22347/match=clone>.
Higgins, B., et al., "Backup and Recovery Snap Manager for SQL Server," DLA Piper, Nov. 2008, 37 Pages.
Hitz, D., et al., "File System Design for an NFS File Server Appliance," Technical Report, USENIX, Winter 1994, 23 Pages.
Jackson, J., "ZFS: The future for storage networks?; File system has massive capacity, but licensing issues and architectural concerns persist," Government Computer News, Media, Inc., Jun. 25, 2007, 2 Pages.
Kay, D., "Working with ZFS Snapshots," Solaris 10 How-To Guides, Version 1.0, Sun Microsystems, Inc., Jan. 5, 2009, 8 Pages.
Kilvansky, M., "A Thorough Introduction to FlexClone Volumes," NetApp, Technical White Paper, Oct. 2004, 35 Pages.
Merrill, J., et al., "SnapVault Best Pratices Guide," NetApp Technical Report, 2008, 29 Pages.
Lal, J., et al., "DB2: Cloning a Database using NetApp FlexClone Technology," NetApp, Apr. 30, 2006, 60 Pages.
Nadgir, N., "Databases and ZFS," Oracle Blog, Sep. 25, 2006, 8 Pages, Can be retrieved from <URL:https://blog.oracle.com/realneel/entry/zfs_and_databases>.
Network Appliance, Inc., "Data Ontap 7.2 Commands: Manual Page Reference, vol. 1," May 16, 2008, 615 Pages.
Network Appliance, Inc., "NetApp Data Management for Decision Support Systems," 2005-2010, 4 Pages.
Network Appliance, Inc., "Flexvol and Flexclone Software," 2006, 2 Pages.
Network Appliance, Inc., "SnapManager 3.0 for Oracle Installation and Administration Guide," Nov. 2008, 294 Pages.
Network Appliance, Inc., "SnapManager 2.2 for Oracle Installation and Administration Guide," Nov. 2007, 310 Pages.
Network Appliance, Inc., "SnapManager 5.0 for Microsoft SQL Server Installation and Administration Guide," Oct. 2008, 492 Pages.
Network Appliance, Inc., "Network Appliance Snapmirror Software," 2006, 2 Pages.
Oracle, "Oracle Database Backup and Recovery User's Guide," 11g Release 1(11.1), Aug. 2008, 598 Pages.
Osuna, A., "An Introduction to FlexClone Volumes" Redbooks, IBM, 2006, 50 Pages.
Osuna, A., "Using IBM DB2 Udb with IBM System Storage N series" Redbooks, IBM, Dec. 2006, 136 Pages.
Osuna, A., "Data Protection Strategies in IBM System Storage N Series" Redbooks, IBM, Jun. 2008, 90 Pages.
Osuna, A., "IBM System Storage N Series SnapMirror" Redbooks, IBM, Jul. 2006, 124 Pages.
Osuna, A., "IBM System Storage N Series SnapVault Best Practices Guide" Redbooks, IBM, 2007, 54 Pages.
Patel, D., et al., "Rapid Database Development and Deployment," NetApp White Paper, Mar. 2007, 11 Pages.

(56) References Cited

OTHER PUBLICATIONS

Patterson, H., et al., "SnapMirror: File System Based Asynchronous Mirroring for Disaster Recovery," Usenix Association, Proceedings of the FAST 2002 Conference on File and Storage Technologies, Jan. 28-30, 2002, 14 Pages.
Sadagopan, P., et al., "Oracle Fusion Middleware DR Solution Using NetApp Storage," NetApp Technical Report, May 2008, 38 Pages.
Schuettinger, S., "NetApp Technical Report—Rapid Deployment of Oracle Database 11g Using VMWare Infrastructure and NetApp Flexclone," NetApp, Jan. 2008, 24 Pages.
Schuettinger, S., "Helping DBAs Become More Efficient NetApp Efficiency and Manageability Advantages," NetApp White Paper, Jul. 2009, 12 Pages.
Sun Microsystems, Inc., "ZFS the File System of the Future," 19 Pages. [No Publication Date].
Sun Microsystems, Inc., "Solaris ZFS Administration Guide," Aug. 2006, 164 Pages.
Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Syncsort Incorporated, "Near-Instant Oracle Cloning with Syncsort AdvancedClient Technologies," Synscort, White Paper, 2007, 12 Pages.
Syncsort Incorporated, "Syncsort Backup Express Advanced Recovery for NetApp," Synscort, 2008, 12 Pages.
Watanabe, S., "Solaris 10 ZFS Essentials," Sun Microsystems, 2010, 146 Pages.
Wikipedia, "ZFS," Last Modified Jul. 22, 2014, 14 Pages.
"ZFS Snapshot and Amazon S3 (Part 2 of 2)," Paul's Blog 3.0 (Release Candidate), Oracle, 2007, 5 Pages.
Harbow, L., "Precisely administrate the virtual environment of hybrid type, Part 2: Thorough review of top 5 products of "High-availability plus Disaster-Recovery" for the virtual environment," Computerworld, Japan, Kabushiki Kaisha IDG Japan, Jan. 1, 2009, vol. 6, No. 1, pp. 42-51 (English Translation Is Not Readily Available).
Office Action for Japanese Patent Application No. P2012-535259, Nov. 26, 2013, 8 Pages.
Office Action for U.S. Appl. No. 13/316,263, Jan. 14, 2013, 7 Pages.
Office Action for U.S. Appl. No. 13/183,131, Oct. 26, 2012, 13 Pages.
Office Action for U.S. Appl. No. 12/647,337, Nov. 26, 2012, 14 Pages.
PCT International Search Report and Written Opinion, PCT/US2010/052963, Dec. 10, 2010, 16 Pages.
PCT International Search Report and Written Opinion, PCT/US2010/052960, Dec. 10, 2010, 17 Pages.
PCT International Search Report and Written Opinion, PCT/US2010/060536, Feb. 28, 2011, 12 Pages.
Supplementary European Search Report for European Patent Application No. EP 10825453, Jun. 28, 2013, 8 Pages.
Supplementary European Search Report for European Patent Application No. EP 10825452, Jun. 28, 2013, 8 Pages.
U.S. Appl. No. 12/603,541, filed Oct. 21, 2009, 104 pages.
U.S. Appl. No. 12/647,337, filed Dec. 24, 2009, 58 pages.
"FlexVol™ abd FlexClone™ Software," Datasheet, Network Appliance, Inc., 2004, 2 Pages.
"FlexClone" Datasheet, Network Appliance, Inc., 2008, 2 Pages.
Meeks, J., "An Oracle Technical White Paper-Oracle Data Guard with Oracle Database 11g Release 2," Oracle, Sep. 2009, 20 Pages.
"NetApp SnapMirror," Datasheet, Network Appliance, Inc., 2008, 2 Pages.
"NetApp Snapshot Technology," Datasheet, Network Appliance, Inc., 2004, 1 Page.
"NetApp SnapManager for Oracle," Datasheet, Network Appliance, Inc., 2008, 2 Pages.
Prasad, STS., et al., "Virtual Database Technology, XML, and the Evolution of the Web", IEEE Computer Society Technical Committee on Data Engineering, 1998, pp. 1-5.
Rajaraman, A., et al., "Virtual Database Technology: Transforming the Internet into a Database", IEEE Internet Computing, Jul./Aug. 1998, pp. 55-58.
Sadagopan, S., "Introduction to WebSphere Federation Server", IBM Data Management Solutions, 2005, pp. 1-45.
"Virtual Databases", Jan. 7, 2008, 4 Pages, [online] [Retrieved on Sep. 19, 2011] Retrieved from the internet <URL:http://www.db2dean.com/PreviouslVirtualDB.html>.
Wilson, A.J., et al., "Multiple Virtual Databases to Support Multiple VOS in R-GMA", CCLRC-Rutherford Appleton Laboratory, UK, 2006, 3 Pages.
Chapman et al., "SnapMirror® Best Practices Guide, NetApp, Inc. Technical Report TR-3446," Apr. 2006, 63 Pages.
Edwards, et al., "FlexVol: Flexible, Efficient File Volume Virtualization in WAFL," Jun. 22, 2008, 22 Pages.
IBM, "IBM System Storage SAN Volume Controller Software V4.3.0 introduces space-efficient VDisks and VDisk mirroring," IBM United States Announcement 208-114, May 13, 2008, 17 Pages.
Microsoft, "Microsoft Developer's Network, Pages and Extents," Microsoft Corporation ("Pages and Extents") Sep. 2007, 2 Pages.
Mullins, "Excerpts of DB2 Developer's Guide, Fifth Ed." May 2004, 5 Pages.
Netapp, 2007 NetApp, Inc., Data Ontap 7.1 Data Protection Online Backup and Recovery Guide, NetApp Technical Doc, Jan. 12, 2007, pp. 508.
Netapp, "Datasheet FlexClone," NetApp Technical Doc, 2008, 2 Pages.
Netapp, "Datasheet FlexVol™ and FlexClone™ Software," NetApp Technical Doc, 2004, 2 Pages.
Netapp, "Datasheet Netapp SnapManager for Oracle," NetApp Technical Doc, 2008, 2 Pages.
Netapp, "Datasheet NetApp SnapMirror," NetApp Technical Doc, 2008, 2 Pages.
Netapp, "Datasheet NetApp Snapshot Technology," NetApp Technical Doc, 2004, 1 Page.
Ranganathan, A., and Neto, A., "Technical Report, SnapManager 3.0 for Oracle Best Practices, TR-3761" Apr. 2009, 88 Pages.
Sun Microsystems, Inc., "ZFS the File System of the Future," Apr. 27, 2009, 19 Pages.
Tate, J., et al., "Implementing the IBM System Storage SAN Volume Controller V4.3," IBM Redbook SG24- 6423-06, Oct. 2008, 970 Pages.
VMware, Inc. and EMC Corporation, "Accelerate Oracle Database log Creation and Deployment Using VMware Infrastructure and EMC Celerra Writeable Checkpoints," Mar. 2008, 16 Pages.
VMware, Inc. and IBM "Using IBM® TotalStorage® Enterprise Storage Server® FlashCopy® Function with the VMware ESX 2.5 Server ("ESX IBM")," Sep. 1, 2005, 25 Pages.
VMware, Inc., "Using Clones to Streamline Development ("Ws5 Clones")," 2005, 9 Pages.
VMware, Inc., "Using VMware Infrastructure for Backup and Restore ("Esx3")," 2006, 20 Pages.
VMware, Inc., "Workstation 5 User's Manual ("WS5 Manual")," 2006, 492 Pages.
Declaration of Erez Zadok in Support of Petition for Inter Partes Review of U.S. Patent No. 8,161,077, Oct. 6, 2014, 87 Pages.
Declaration of Erez Zadok in Support of Petition for Inter Partes Review of U.S. Patent No. 8,161,077, Oct. 6, 2014, 95 Pages.
Declaration of Erez Zadok in Support of Petition for Inter Partes Review of U.S. Patent No. 8,468,174, Oct. 23, 2014, 98 Pages.
Declaration of Erez Zadok in Support of Petition for Inter Partes Review of U.S. Patent No. 8,468,174, Oct. 23, 2014, 99 Pages.
Declaration of Erez Zadok in Support of Petition for Inter Partes Review of U.S. Patent No. 8,566,361, Oct. 21, 2014, 99 Pages.
Declaration of Erez Zadok in Support of Petition for Inter Partes Review of U.S. Patent No. 8,566,361, Oct. 21, 2014, 84 Pages.
Declaration of Erez Zadok in Support of Petition for Inter Partes Review of U.S. Patent No. 8,150,808, Oct. 2, 2014, 85 Pages.
Declaration of Erez Zadok in Support of Petition for Inter Partes Review of U.S. Patent No. 8,150,808, Oct. 2, 2014, 78 Pages.
Declaration of Erez Zadok in Support of Petition for Inter Partes Review of U.S. Patent No. 8,150,808, Oct. 2, 2014, 84 Pages.

(56) References Cited

OTHER PUBLICATIONS

Declaration of Erez Zadok in Support of Petition for Inter Partes Review of U.S. Patent No. 8,150,808, Oct. 6, 2014, 97 Pages.
Declaration of Erez Zadok in Support of Petition for Inter Partes Review of U.S. Patent No. 8,548,944, Oct. 7, 2014, 98 Pages.
Declaration of Erez Zadok in Support of Petition for Inter Partes Review of U.S. Patent No. 8,548,944, Oct. 8, 2014, 98 Pages.
Petition for Inter Partes Review of U.S. Patent No. 8,161,077, Oct. 6, 2014, 62 Pages.
Petition for Inter Partes Review of U.S. Patent No. 8,161,077, Oct. 6, 2014, 65 Pages.
Petition for Inter Partes Review of U.S. Patent No. 8,468,174, Oct. 23, 2014, 64 Pages.
Petition for Inter Partes Review of U.S. Patent No. 8,566,361, Oct. 21, 2014, 66 Pages.
Petition for Inter Partes Review of U.S. Patent No. 8,150,808, Oct. 3, 2014, 65 Pages.
Petition for Inter Partes Review of U.S. Patent No. 8,150,808, Oct. 3, 2014, 61 Pages.
Petition for Inter Partes Review of U.S. Patent No. 8,150,808, Oct. 7, 2014, 65 Pages.
Petition for Inter Partes Review of U.S. Patent No. 8,548,944, Oct. 8, 2014, 66 Pages.
Petition for Inter Partes Review of U.S. Patent No. 8,548,944, Oct. 8, 2014, 65 Pages.
Chinese Second Office Action, Chinese Application No. 2010800584313, Dec. 16, 2014, 5 Pages.

\* cited by examiner

DATACENTER WORKFLOW AUTOMATION SCENARIOS USING VIRTUAL DATABASES

RELATED APPLICATIONS

This application is a continuation of U.S. patent application Ser. No. 13/316,263 filed on Dec. 9, 2011, which is a continuation of U.S. patent application Ser. No. 12/603,545 filed on Oct. 21, 2009 and issued on Apr. 17, 2012 as U.S. Pat. No. 8,161,077, each of which is incorporated by reference herein in its entirety.

BACKGROUND

This invention relates generally to databases, and in particular to storage efficient systems for managing databases and lifecycle workflows based on databases.

Databases store the data that is critical to an organization and thus form an important part of an organization's information technology infrastructure. As the information available in an organization grows, so does the complexity of the infrastructure required to manage the databases that store the information. The increased complexity of the infrastructure increases the resources required to manage the databases and the applications that depend on the databases. These increased costs may include the costs associated with hardware for managing the databases as well as the costs associated with additional personnel needed to maintain the hardware. The increased complexity of the infrastructure also affects the maintenance operations associated with the databases, for example, causing backup and recovery operations to take significantly longer.

In a typical organization's infrastructure environment, production database servers run applications that manage the day-to-day transactions of the organization. Changes to production databases or to applications that depend on the production databases are tested on copies of the databases to protect the production environment. Copies of the production databases may be required for several stages in the lifecycles of workflows associated with the production database and applications that depend on the production databases. For example, the stages in the lifecycle of a change incorporated in a production database may include a development stage, a tuning stage, a testing stage, a quality assurance stage, a certification stage, a training stage, and a staging stage. Making copies of the production databases for each stage requires redundant and expensive hardware infrastructure as well as the time overhead required to copy the data, which may take days or weeks. Additional hardware also requires additional costs associated with physically storing the hardware, such as floor space requirements and costs related to power and cooling. Furthermore, redundant hardware typically causes inefficient use of available resources.

Lifecycle workflows can be complex and often involve coordination across multiple teams. Hence, making a database available for a specific purpose, such as for supporting a particular stage in the lifecycle, may require further processing associated with the databases. For example, databases often contain critical confidential information, causing security and integrity to be important considerations in an environment managing databases. As a result, access permissions required for different teams working on different stages are often different. For example, data that can be accessed by personnel managing the production database server is often different from data that can be accessed by a person working in the testing stage of the lifecycle. This causes further complications related to administration of permissions across various stages of the lifecycle of any workflow related to the databases.

SUMMARY

Virtual databases (VDBs) combined with operations on virtual databases enable efficient execution of workflow scenarios that are typically executed using conventional database systems. An embodiment allows test and development of databases and database applications using a virtual database system. A source database is linked to a database storage system by receiving information identifying the source database. Multiple point-in-time copies of the source database are loaded by receiving database blocks for the point-in-time copies of the source database and storing them on the database storage system. A test virtual database (VDB) is provisioned to a test system and a development virtual database is provisioned to a development system. In an embodiment, the test VDB is created from a point-in-time copy of a development VDB. The provisioning of the virtual databases is performed by creating a set of files linked to the stored database blocks on the storage system, and mounting the set of files to the target system. A database server running on the target system is allowed to access the set of files. In an embodiment, backup of the stored database blocks on the storage system may be performed by copying the database blocks to another storage system.

In some embodiments, pre-script and post-script operations are performed before and after specific operations including linking, loading, and provisioning. The pre-script and post-script operations allow special purpose logic to be executed before or after a VDB operation, for example, copying of application specific data, filtering of information by excluding selective information, masking data, and the like. In some embodiments, pre-script and post-script operations associated with a provisioning operation allow setting of system environment associated with the VDB and applications running using the VDB. In some embodiments the test and development VDBs are refreshed by periodically obtaining point-in-time copies of the source database and automatically provisioning the VDBs based on the latest point-in-time copy obtained. In an embodiment, a quality assurance (QA) VDB is provisioned based on a point-in-time copy of the development VDB. Users of the test VDB and QA VDB may be granted appropriate permissions allowing them access to the data in the QA VDB.

Another embodiment allows remote test and development of databases and database applications using a virtual database system. A source database is linked to a database storage system by receiving information identifying the source database. Multiple point-in-time copies of the source database are loaded by receiving database blocks for the point-in-time copies of the source database and storing them on the database storage system. The stored database blocks are transmitted from the first storage system to a second storage system. A test virtual database is provisioned to a test system and a development virtual database is provisioned to a development system based on the database blocks stored in the second storage system. In an embodiment, the test VDB is created from a point-in-time copy of a development VDB. The provisioning of the virtual databases is performed by creating a set of files linked to the stored database blocks on the second storage system, and mounting the set of files to the target system. A database server running on the target system is allowed to access the set of files. In some embodiments, pre-script and post-script operations are performed before and after the VDB operations including linking, loading, and provisioning. For example, pre-script and post-script operations associated with transmission of database blocks allow masking, purging, compression, and encryption of data being transmitted.

Another embodiment, allows replication of databases using a virtual database system. A source database to be replicated is linked to a storage system by receiving information identifying the source database. Multiple point-in-time copies of the source database are loaded by receiving database blocks for the point-in-time copies of the source database and storing them on the storage system. The database blocks stored in the storage system are replicated to a second storage system by transmitting database blocks from the first storage system to the second storage system. The transmitted database blocks represent database blocks in the first storage system that changed since a given point-in-time. Virtual databases are provisioned from the second storage system to a system running a database server. The provisioning of virtual database includes creation of a set of files linked to the stored database blocks on the second storage system and mounting of the set of files to the system running the database server. The database server running on the system is provided access to the set of files associated with the virtual database.

Another embodiment, allows creation of data warehouse and data marts from a database. A source database containing data to be used for a data warehouse is linked to a storage system by receiving information identifying the source database. Multiple point-in-time copies of the source database are loaded by receiving database blocks for the point-in-time copies of the source database and storing them on the storage system. A virtual database (VDB) is provisioned to an operational data store (ODS) system by creating a set of files linked to the stored database blocks on the storage system, and mounting the set of files to the operational data store system. Extract, transform, and load (ETL) operations are performed on the data in the virtual database and the output of the ETL operations is stored in a database in a data warehouse system. Database blocks for different point-in-time copies of the database in the data warehouse are received and stored in the storage system. A VDB is created and provisioned to a data mart system, by creating a set of files linked to the stored database blocks associated with the database on the data warehouse system and mounting the set of files to the data mart system. In some embodiments, data mart VDBs may be created and provisioned to a data mart system based on subsets of data in the data warehouse database.

In some embodiments the ODS VDB is refreshed by periodically obtaining point-in-time copies of the source database and automatically provisioning the VDBs based on the latest point-in-time copy obtained. Refreshing the ODS VDB allows refresh of the reports in the data warehouse database, and the data marts automatically. In some embodiments, backup of the storage system may be performed allowing backup of the entire data associated with the source database and the virtual databases created based on the source database.

An embodiment allows backups of source database using a database storage system for storing virtual databases. One or more source databases are linked to the database storage system. Multiple point-in-time copies of the source databases are loaded into the database storage system. Virtual databases are provisioned using the point-in-time copies of the source databases stored in the database storage system. Backup of database blocks stored in the database storage system is performed by transmitting database blocks associated with the source databases from the database storage system to a backup storage system. The database blocks are stored in the backup system for use, for example, in case of system crashes associated with the source databases. In an embodiment, the backup storage system is a tape backup system.

The features and advantages described in this summary and the following detailed description are not all-inclusive. Many additional features and advantages will be apparent to one of ordinary skill in the art in view of the drawings, specification, and claims.

Figure 1:
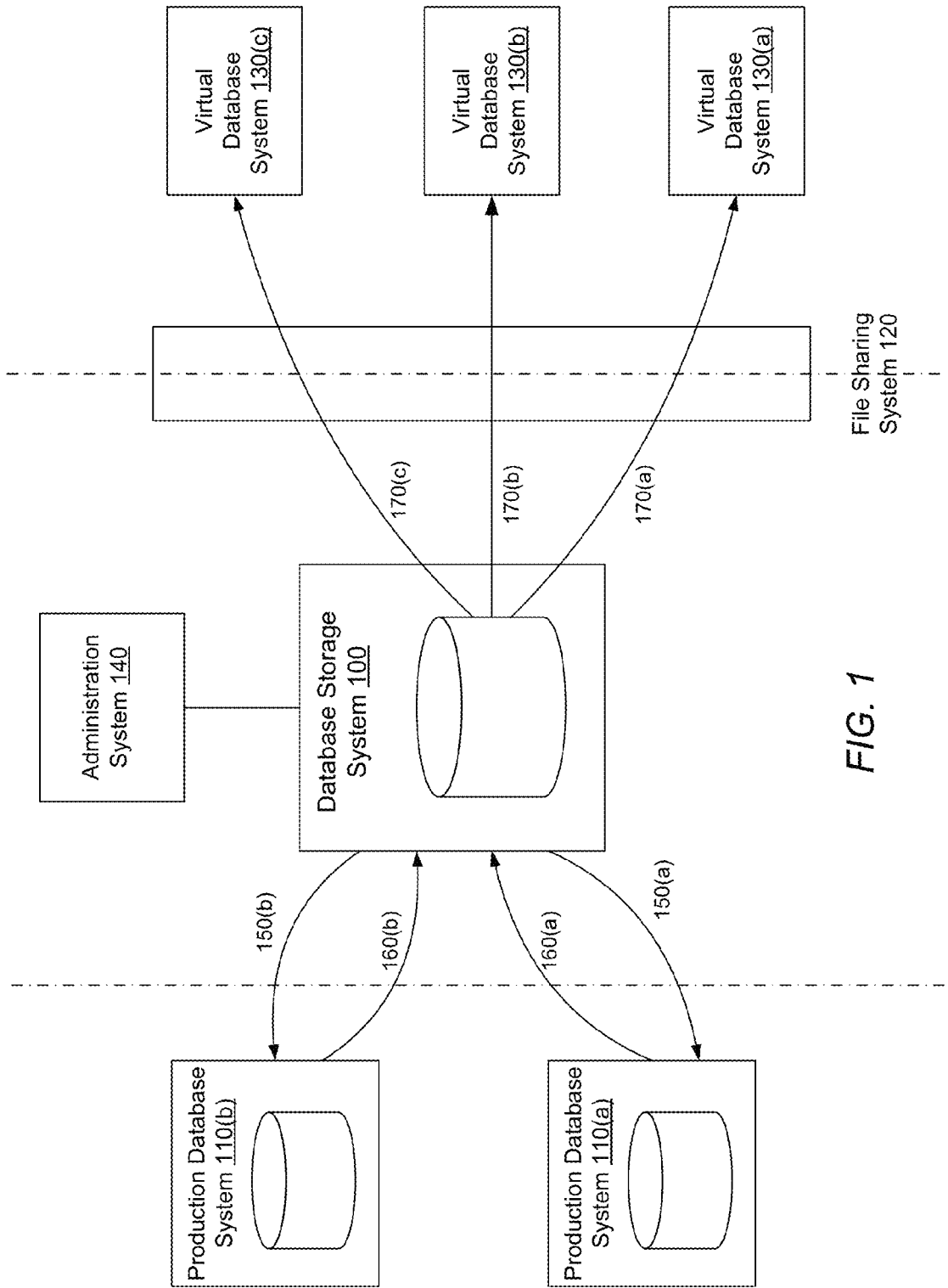
FIG. 1 is diagram illustrating how information is copied from a production database to a database storage system and provisioned as virtual databases using a file sharing system, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Virtual Database Systems

In certain embodiments of the invention, one or more virtual databases are created based on the state of a production database or a virtual database at a particular point in time, and the virtual databases can then be individually accessed and modified as desired. A database comprises data stored in a computer for use by computer implemented applications. A database server is a computer program that can interact with the database and provides database services, for example, access to the data stored in the database. Database servers include commercially available programs, for example, database servers included with database management systems provided by ORACLE, SYBASE, MICROSOFT SQL SERVER, IBM's DB2, MYSQL, and the like. A database may be implemented using a database model, for example, a relational mode, object model, hierarchical mode or network model. The term "production database" is used in particular examples to illustrate a useful application of the technology; however, it can be appreciated that the techniques disclosed can be used for any database, regardless of whether the database is used as a production database. Furthermore, embodiments can create a virtual database using storage level snapshots of production databases or clones of production databases instead of a live production database. The virtual databases are "virtual" in the sense that the physical implementation of the database files is decoupled from the logical use of the database files by a database server.

In one embodiment, information from the production database is copied to a storage system at various times, such as periodically. This enables reconstruction of the database files associated with the production database for these different points in time. The information may be managed in the storage system in an efficient manner so that copies of information are made only if necessary. For example, if a portion of the database is unchanged from a version that was previously copied, that unchanged portion need not be copied. A virtual database created for a point in time is stored as a set of files that contain the information of the database as available at that point in time. Each file includes a set of database blocks and the data structures for referring to the database blocks. In some embodiments, the database blocks may be compressed in order to store them efficiently. In some embodiments, the database blocks may be stored in the storage system data store 390 in an encrypted form to increase security of stored data. A virtual database may be created on a database server by creating the database files for the production database corresponding to the state of the production database at a previous point in time, as required for the database server. The files corresponding to the virtual database are made available to the database server using a file sharing mechanism, which links the virtual database to the appropriate database blocks stored on the storage system. The process of making the virtual database available to a database server is called "provisioning" the virtual database. In some embodiments, provisioning the virtual database includes managing the process of creating a running database server based on virtual database. Multiple VDBs can be provisioned based on the state of the production database at the same point in time. On the other hand, different VDBs can be based on different point in time state of the same production database or different production databases. In some embodiments, provisioned databases are monitored for health and user actions. The database storage system 100 is notified of these events. The database storage system 100 handles these events based on either built-in or user specified rules. For example, if a user action affects availability of a virtual database, a warning message can be displayed on monitoring console or transmitted to a user via email. The database server on which a virtual database has been provisioned can then read from and write to the files stored on the storage system. A database block may be shared between different files, each file associated with a different VDB. In particular, a database block is shared if the corresponding virtual database systems 130 are only reading the information in the database block and not writing to the database block. In one embodiment, the virtual database manager 375 makes copies of the database blocks only if necessary. For example, a particular database block may be shared by multiple VDBs that read from the same database block. But if one of virtual database systems 130 attempts to write to the database block, a separate copy of the database block is made because the writing operation causes that database block to be different for the VDB corresponding to that virtual database systems 130 than it is for the other VDBs.

FIG. 1 illustrates one embodiment for how information may be copied from a production database to a database storage system and provisioned as virtual databases using a file sharing system. The production database systems 110 manage data for an organization. In some embodiments information may be copied from storage level snapshots of production databases or clones of production databases instead of a live production database. The database storage system 100 retrieves data associated with databases from one or more production database systems 110 and stores the data in an efficient manner, further described below. A database administrator user interface 140 allows a database administrator to perform various actions supported by the database storage system 100.

In response to a request from the administrator system 140, or based on a predefined schedule, the database storage system 100 may send a request 150 for data to a production database system 110. The production database system 110 responds by sending information stored in the production database as a stream of data 160. The request 150 is sent periodically and the production database system 110 responds by sending information representing changes of data stored in the production database since the last response 160 sent by the production database system 110. The database storage system 100 receives the data 160 sent by the production database system 110 and stores the data. The database storage system 100 may analyze the data 160 received to determine whether to store the information or skip the information if the information is not useful for reconstructing the database at previous time points. The database storage system 100 stores the information efficiently, for example, by keeping versions of database blocks that have changed and reusing database blocks that have not changed. In an embodiment, database storage system 100 employs a hierarchical caching system where high speed solid-state drive (SSD) or equivalent storage devices are configured for caching read operations and for persisting logs for writing operations to magnetic disks.

To create a virtual database, the database storage system 100 creates files that represent the information corresponding to the production database system 110 at a given point in time. The database storage system 100 exposes 170 the corresponding files to a virtual database system 130 using a file sharing system 120. The virtual database system 130 runs a database server that can operate with the files exposed 170 by the database storage system 100. Hence, a virtual copy of the production database is created for the virtual database system 130 for a given point in time in a storage efficient manner.

Figure 2A:
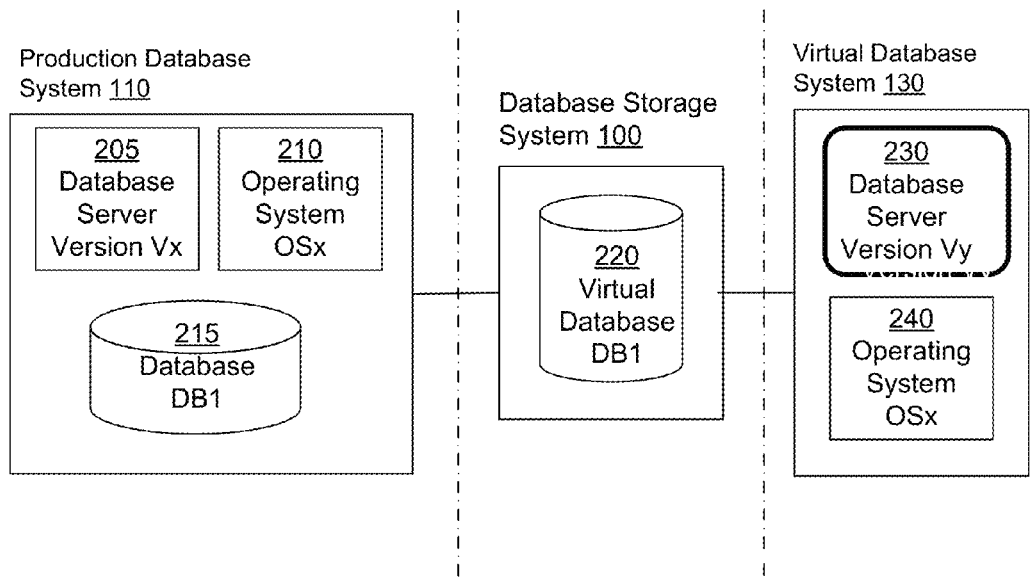
FIG. 2a is a diagram showing how a virtual database system may run a different version of the database server compared to the version of the database server on the production database system that is the source of the database being virtualized, in accordance with an embodiment of the invention.
Figure 2B:
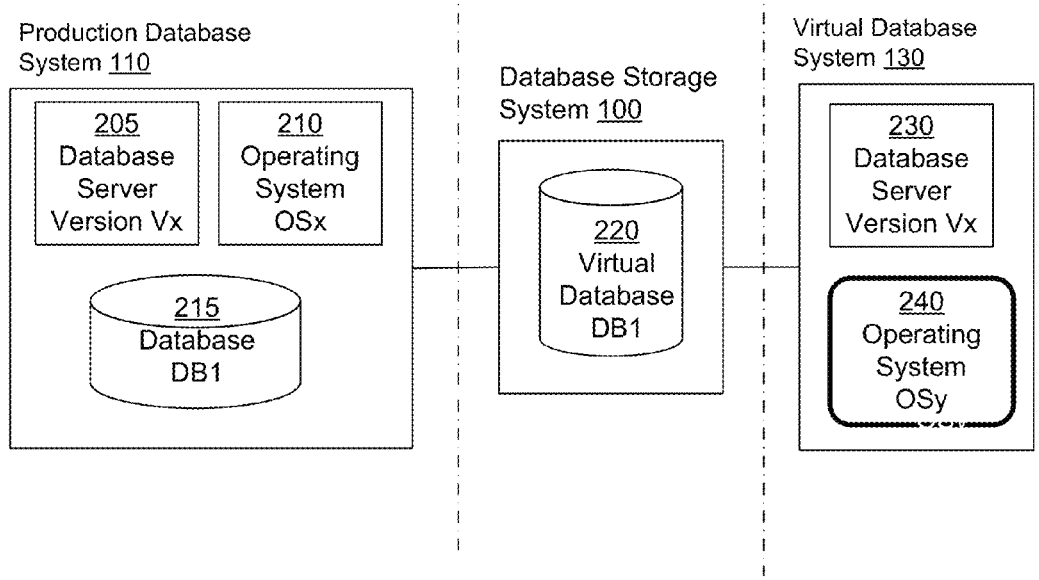
FIG. 2b is a diagram showing how a virtual database system may run using a database server executing on an operating system that is different compared to the operating system executing the database server of the production database system that is the source of the database being virtualized, in accordance with an embodiment of the invention.

FIG. 2 shows that a virtual database system 130 may run a different version of the database server and/or a different operating system compared to the production database system 110 that is the source of the database being virtualized. The virtual database files stored in the database storage system 100 are appropriately modified so that the virtual database system 130 can operate with the files even though the database server 230 has a different version compared to the database server 205 and/or a different operating system 240 compared to operating system 210. As shown in FIG. 2(*a*) the database server 230 running on the virtual database system 130 has version Vy which is different from the version Vx of the database server 205 running on the production database system 110. Similarly, as shown in FIG. 2(*b*) the operating system 240 running on the virtual database system 130 is OSy which is different the operating system OSx running on the production database system 110. In one embodiment, server 230 and 205 may run dissimilar database software programs. This provides the ability to try different operating systems or database server versions for running the database. In the case of database and/or application upgrade, patching, or migration, this ability makes it easy to test the operation without any effect on production system. Operations can be then certified in an isolated environment prior to deployment into a production system. In some embodiments, the database storage system 100 may be executed on a virtual machine provided by platform virtualization software or server virtualization software that allows multiple operating systems to run on a host computer concurrently.

System Architecture

Figure 3:
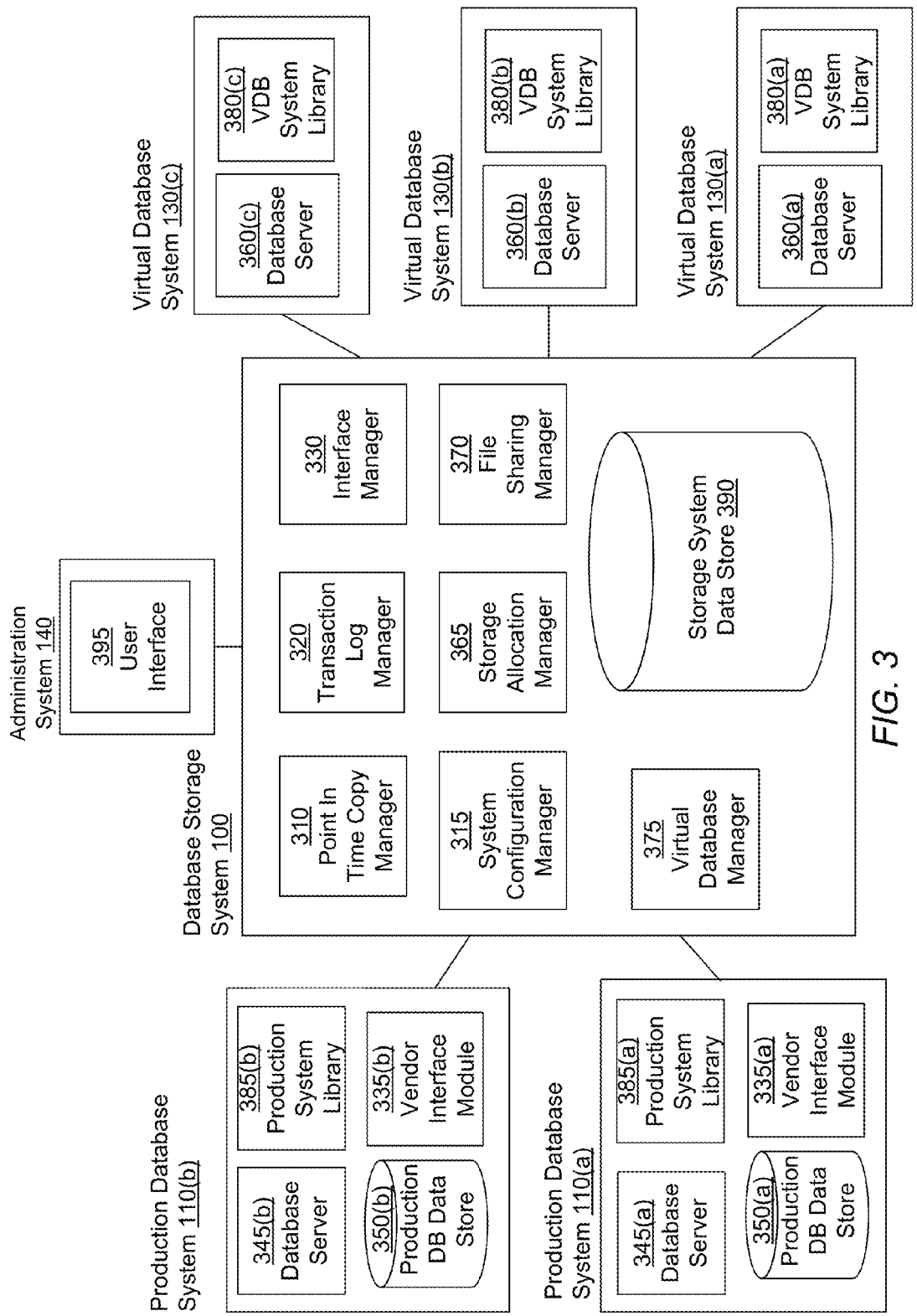
FIG. 3 is a schematic diagram of the architecture of a system that makes storage efficient copies of information from a production database and provisions virtual databases, in accordance with an embodiment of the invention.

FIG. 3 shows a high level block diagram illustrating a system environment suitable for making storage efficient copies of information from a production database and provisioning one or more virtual databases using that information. The system environment comprises one or more production database systems 110, a database storage system 100, an administration system 140, and one or more virtual database systems 130. Systems shown in FIG. 3 can communicate with each other if necessary via a network.

A production database system 110 is typically used by an organization for maintaining its daily transactions. For example, an online bookstore may save all the ongoing transactions related to book purchases, book returns, or inventory control in a production system 110. The production system 110 includes a database server 345, a production DB data store 350, a vendor interface module 335, and a production system library 385. In alternative configurations, different and/or additional modules can be included in a production database system 110.

The production DB data store 350 stores data associated with a database that may represent for example, information representing daily transactions of an enterprise. The database server 345 is a computer program that provides database services and application programming interfaces (APIs) for managing data stored on the production DB data store 350. The production system library 385 provides APIs useful for extracting information from the production database system 110. The vendor interface module 335 represents APIs provided by a vendor for customizing functionality provided by the database server 345, for example, APIs to retrieve database blocks that changed since a previous time point. An example of a vendor interface module is the program code of a database server provided by vendor ORACLE that implements RMAN APIs. Database servers provided by other vendors, for example, MICROSOFT's SQL SERVER or IBM's DB2 have similar APIs. In one embodiment, the vendor interface module 335 mounts the production DB data store 350 of the production database system 110 on the database storage system 100 using a file sharing system similar to the file sharing system 120. Mounting the production DB data store 350 on the database storage system 100 allows transfer of information stored on the production database system 110 to the database storage system 100.

The production system library 385 may be implemented in different ways depending on the requirements of the vendor interface module 335. In an embodiment, the vendor interface module 335 loads the production system library 385 in order to call back functions implemented in the production system library 385. For example, the production system library 385 may be a shared object file with a ".so" or a ".DLL" file extension that contains executable program code that can be called by a C/C++ executable program or by a JAVA program that uses the JAVA NATIVE INTERFACE for interaction with binary code generated by C/C++ programs. Alternatively, the production system library 385 may be implemented using the JAVA programming language and installed in the production database system 110 as a file with ".jar" extension. The java program requires a JAVA VIRTUAL MACHINE running on the production database system 110 for execution. In another embodiment, a part of the production system library 385 may be implemented as an executable ".so" shared object file and another part of the production system library 385 may be implemented as a JAVA program installed as a ".jar" file.

The vendor interface module 335 responds to requests from database storage system 100, and in response to the requests, collects requested information from the production DB data store 350 and returns the collected information to the database storage system 100. The vendor interface module 335 may send request to the database server 345 for retrieving information from the production DB data store 350. The vendor interface module 335 loads the program code in the production system library 385 and invokes it to transmit the stream of data for to the database storage system 100 for further processing. In some embodiments the vendor interface module 335 may directly interact with the production DB data store 350 instead of sending a request to the database server 345 to retrieve the necessary database blocks. In other embodiments, the vendor interface module 335 may retrieve the necessary database blocks from storage level snapshots of production databases or clones of production databases instead of a live production database.

The database storage system 100 retrieves information available in the production database systems 110 and stores it. The information retrieved includes database blocks comprising data stored in the database, transaction log information, metadata information related to the database, information related to users of the database and the like. The information retrieved may also include configuration files associated with the databases. For example, databases may use vendor specific configuration files to specify various configuration parameters including initialization parameters associated with the databases. Copying the configuration files allows a VDB to be created with configuration parameters similar to the source production database. In some embodiments, the configuration parameters files may be modified by a database administrator using the user interface 395 to customize the VDB configuration for a specific usage scenario. For example, the production database may be accessed by a database server 345 using a particular cache size whereas the corresponding VDB may be accessed by a database server 360 using a different cache size.

The information retrieved may also include information associated with applications using the database, for example, an enterprise resource planning (ERP) application may be using the database and may have data specific to the ERP application. Retrieving the ERP application data allows a similar ERP application to be executed with a VDB created based on the production database system. This is beneficial for usage scenarios where a VDB is created for an environment similar to the production environment, for example, for testing and development. A database administrator can use the user interface 395 to specify logic for copying the information that is specific to a production environment as well as logic for appropriately installing the information with a VDB for use by a virtual database system 130.

In some embodiments, information regarding users of the production database, for example, the users with administrative privileges may be obtained by using specific APIs or by running specific scripts on the production database. The information about the users can be used to facilitate life cycle management of VDBs in the system. In an embodiment, a database administrator is allowed to use the user interface 395 in order to specify information regarding user accounts to be created and their access permissions. For example, if the VDB is created for testing purposes, test users may be created on the VDB for test organization whereas if the VDB is created as a standby for the production database, only users with production support roles should have access. In some embodiments, access permission may specify if a user can provision a privileged VDB. One example of privileged VDB is a VDB with full access to non-public information (information that may not be accessible to non-privileged users), for example, social security numbers or credit card information. The corresponding un-privileged VDB is a VDB with non-public information masked or scrambled. Another example of privileged VDB is a VDB with sensitive data accessible transparently. The corresponding un-privileged VDB is a VDB with sensitive information encrypted.

In some embodiments, access privileges are simplified to three levels: administrator, owner, and auditor. Administrator has full control of all managed objects including databases and hosts. The control available to an administrator included policy management. Owner has access to use of resources, for example, an owner can provision a VDB. Auditor can view logs but may not have rights to consume system resources.

The data stored in the storage system data store 390 can be exposed to a virtual database system 130 allowing the virtual database system 130 to treat the data as a copy of the production database stored in the production database system 110. The database storage system 100 includes a point-in-time copy manager 310, a transaction log manager 320, a interface manager 330, a system configuration manager 315, a storage allocation manager 365, a file sharing manager 370, a virtual database manager 375, and a storage system data store 390. In alternative configurations, different and/or additional modules can be included in the database storage system 100.

The point-in-time copy manager 310 interacts with the production database system 110 by sending a request to the vendor interface module 335 to retrieve information representing a point-in-time copy (also referred to as a "PIT copy") of a database stored in the production DB data store 350. The point-in-time copy manager 310 stores the data obtained from the production database system 110 in the storage system data store 390. The data retrieved by the point-in-time copy manager 310 corresponds to database blocks (or pages) of the database being copied from the production DB data store 350. After a first PIT copy request to retrieve information production DB data store 350, a subsequent PIT copy request may need to retrieve only the data that changed in the database since the previous request. The data collected in the first request can be combined with the data collected in a second request to reconstruct a copy of the database corresponding to a point in time at which the data was retrieved from the production DB data store 350 for the second request.

The transaction log manager 320 sends request to the production database system 110 for retrieving portions of the transaction logs stored in the production database system 110. In some embodiments, the request from the transaction log manager 320 is sent to the vendor interface module 335. The data obtained by the transaction log manager 320 from the vendor interface module 335 is stored in the storage system data store 390. In one embodiment, a request for transaction logs retrieves only the changes in the transaction logs in the production database system 110 since a previous request for the transaction logs was processed. The database blocks retrieved by a point in time copy manager 310 combined with the transaction logs retrieved by the transaction log manager 320 can be used to reconstruct a copy of a database in the production system 110 corresponding to times in the past in between the times as which point-in-time copies are made.

The storage allocation manager 365 provides the functionality of saving data retrieved from the production database system 110. For example, the point-in-time copy manager 310 may call APIs of storage allocation manager to save blocks of data retrieved from the production database system 110. The storage allocation manager 365 keeps track of the various versions of each block of data that may be obtained from the production database system 110. For a given time point, the storage allocation manager 365 can be requested to provide the latest version of a block of data obtained before the given time point. The storage allocation manager 365 can also be used for making copies of blocks of data. If a block of data is copied for read-only purposes, the storage allocation manager 365 allocates only sufficient storage to keep a pointer of reference to the exiting block of data. However, if an attempt to write to the copied block of data is made, the storage allocation manager 365 allocates sufficient storage to make an actual copy of the block of data to avoid updating the original block of data.

The file sharing manager 370 allows files stored in the storage system data store 390 to be shared across computers that may be connected with the database storage system 100 over the network. The file sharing manager 370 uses the file sharing system 120 for sharing files. An example of a system for sharing files is a network file system (NFS). A system for sharing files may utilize fiber channel Storage area networks (FC-SAN) or network attached storage (NAS) or combinations and variations thereof. The system for sharing files may be based on small computer system interface (SCSI) protocol, internet small computer system interface (iSCSI) protocol, fiber channel protocols or other similar and related protocols. In some embodiments, the database storage system 100 may utilize a logical volume manager. Sharing a file stored in the storage system data store 390 using the file sharing manager 370 allows a remote computer, for example, the virtual database systems 130 to access the data in the shared file. A remote system may be able to read and write from/to the file shared by the storage system data store 390. In an embodiment, files are organized in a format emulating a given file system disk layout, such as the file system of WINDOWS operating system called NTFS or the UNIX file system (UFS).

The virtual database manager 375 receives requests for creation of a virtual database for a virtual database system 130. The request for creation of a virtual database may be sent by a database administrator using the administration system 140 and identifies a production database system 110, a virtual database system 130, and includes a past point-in-time corresponding to which a virtual database needs to be created. The virtual database manager 375 creates the necessary files corresponding to the virtual database being created and shares the files with the virtual database system 130. The database administrator for a virtual database system 130 may be different from a database administrator for the production database system 110.

The interface manager 330 renders for display information necessary for display using the administration system 140. A database administrator user can see information available in the storage system data store 390 as well as take actions executed by the database storage system. For example, a database administrator can see the different production databases stored in the storage system data store 390 obtained from different production database systems 110. As another example, the database administrator can request the database storage system 100 to make a PIT copy of a database stored on a production database system 110 at a particular point-in-time. In an embodiment, the interface manager 330 allows external applications to access information of the database storage system 100. For example, the database storage system may provide application programming interface (API) to allow third party vendors to write applications based on database storage system 100. In an embodiment, the interface manager 330 provides web services that allow web applications to access information available in the database storage system 100. For example, the database storage system can be part of a cloud computing environment. A third party vendor can use web services to implement various workflow scenarios based on VDBs, for example the various workflow scenarios described herein. This allows automation of the workflow scenarios based on VDBs.

The system configuration manager 315 allows a database administrator using the administration system 140 to setup or change the configuration of the database storage system 100. For example, when the database storage system is being initially setup or at a later stage, the system configuration manager 315 allows a database administrator user or an agent to specify production database systems 110 and virtual database systems 130 to connect to. The system configuration manager 315 also allows a user with appropriate roles and privileges to setup policies specifying the schedule with which the point-in-time copy manager 310 retrieves PIT copies of databases in the production database systems 110 as well as the frequency and the times at which the transaction log manager 320 retrieves updates to online transaction logs from the production database systems 110. In an embodiment, a schedule can specify the frequency and times during the day for the PIT and log retrieval actions or it could be an a periodic schedule specifying the calendar days when the same action should take place.

In an embodiment, policies can be defined by a database administrator and stored in the system configuration manager 315 for various operations associated with the loading of point-in-time copies from production database systems 110, loading of transaction logs from the production database systems 110, purging of information from the database storage system 100 including point-in-time copies of databases and transaction log information, and provisioning of virtual database systems. A policy specifies rules for executing the specific operation. For example, a policy may specify the operation to be executed based on a predetermined schedule. A policy may determine when to purge PIT copies stored in the database storage system 100 based on number of PIT copies that have been accumulated for a production database. A policy may measure storage availability to determine when to purge information. For example, if the amount of storage available reaches below a threshold level, old PIT copies of selected databases may be purged. The policy may also specify priority of production databases to be used before purging information, for example, low priority database information is purged before purging high-priority database information. In a particular workflow scenario, a policy may determine when to obtain new information from a production database and automatically update VDB information and provision the updated VDB based on the new information.

A virtual database system 130 includes a database server 360 and a VDB system library 380. The database server 360 is similar in functionality to the database server 345 and is a computer program that provides database services and application programming interfaces (APIs) for managing data stored on a data store 350. The data managed by the database server 360 may be stored on the storage system data store 390 that is shared by the database storage system 100 using a file sharing system 120. The VDB system library 380 contains program code for processing requests sent by the database storage system 100. In alternative configurations, different and/or additional modules can be included in a virtual database system 130.

Figure 4:
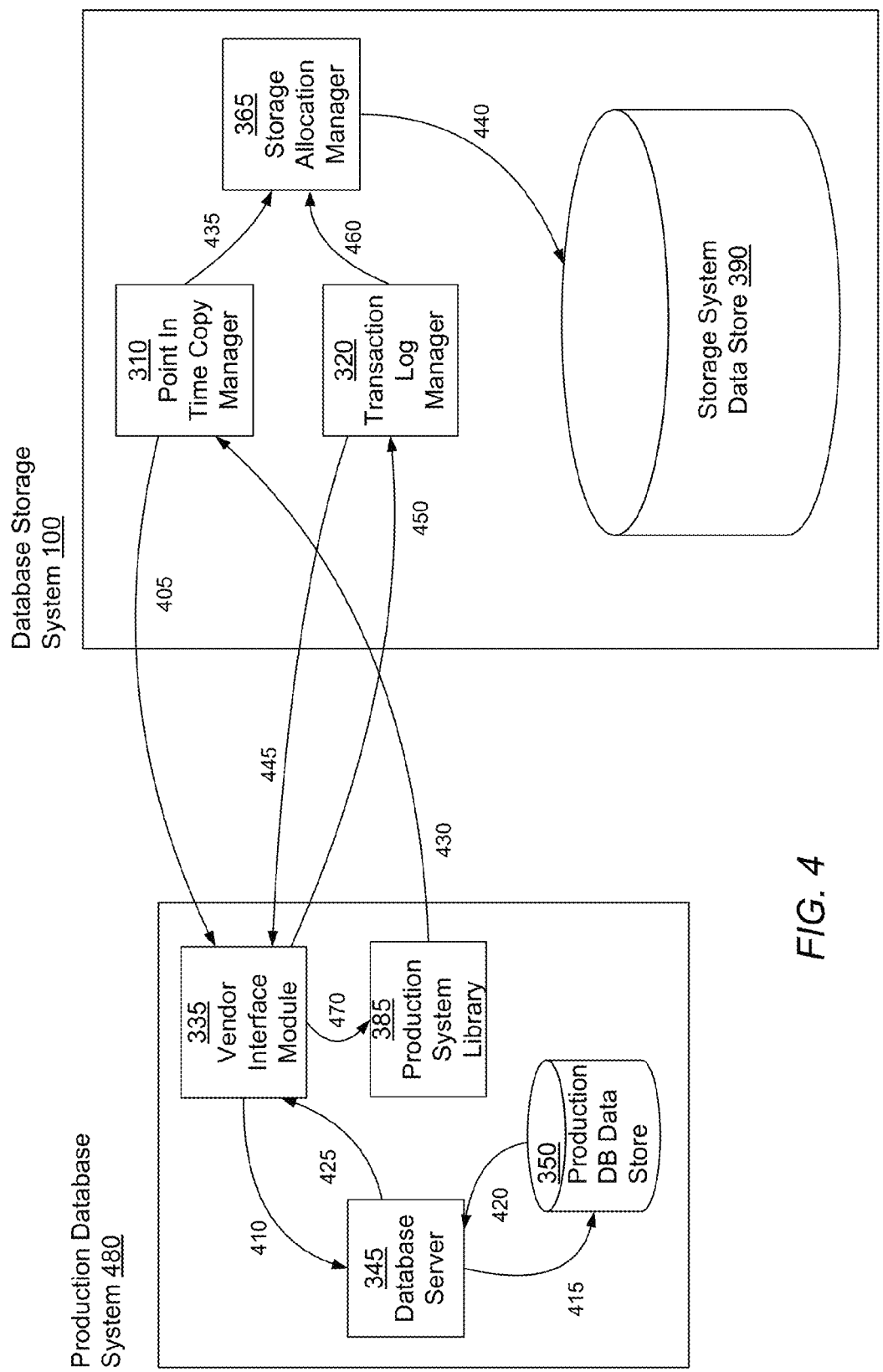
FIG. 4 illustrates the interaction between components of a database storage system and the components of a production database system for making a storage efficient copy of the production database on the database storage system, in accordance with an embodiment of the invention.

FIG. 4 shows the interactions between the database storage system 100 and the production database system 110 to make point-in-time copies of the data stored in a database in the production database system 110. The point-in-time copy manager 310 sends 405 a request to the vendor interface module 335 of the production database system 110 for retrieving data associated with a database of the production database system 110. In an embodiment, the request 405 is sent using the secure shell or SSH network protocol that allows data to be interchanged between two networked devices. The request 405 may be sent in response to a request from the administration system 140 or may be configured as a periodically scheduled action. For example, the database storage system 100 may be configured to send 405 a request to the production database system 110 at a predetermined time every day. The system environment illustrated in FIG. 4 does not require a process dedicated with the database storage system 100 to be constantly executed on the production database system 480. This is beneficial to the production database system 480 since a process dedicated to sending information to the database storage system 100 may consume significant resources of the production system and may not be desirable. Hence, the database storage system sends the requests 405, 450 whenever it needs information from the production database system 480.

The production database system 480 sends the requested data to the point-in-time copy manager 310. If the request 405 is the first request for data associated with a database stored on the production database system 110, the production database system 480 sends the data of the entire database in reply. In response to subsequent requests 405, the production database system 480 sends only the data of the database blocks that changed since the last time a reply was sent 430 in response to a previous request 405.

In an embodiment, the vendor interface module 335 sends 410 a request to the database server 345 to collect the information required for the reply 430. The vendor interface module 335 also loads the program code available in the production system library 385. The database server sends 415 a request for the necessary data to the data store 350 and receives the requested data in response 420. The database server 345 sends 425 the requested data to the vendor interface module 335 in response to the request 410. The vendor interface module 335 invokes 470 the production system library 385 to package the data received 425 from the database server into a format that can be processed by the point-in-time copy manager 310. The production system library 385 sends 430 the requested data stream that is formatted appropriately to the point-in-time copy manager 310. The production system library 385 sends 430 the information sent 425 by the database server to the point-in-time copy manager 310. The vendor interface module 335 in conjunction with the program code of the production system library 385 builds the data stream for processing by the database storage system 100.

In other embodiments, the vendor interface module 335 in conjunction with the production system library 385 obtains the required data directly from the data store 350 and sends 430 the data to the point-in-time copy manager 310. Typically, these embodiments are beneficial when the database server 345 does support appropriate APIs for extracting the necessary information. In these embodiments, the production system library 385 includes code to analyze the structures of the files of the database stored in the data store 350 and also includes code to process metadata associated with database blocks stored in the data store 350 to find database blocks that changed since a previous time point.

The reply 430 is a stream of data comprising database blocks that may be stored in multiple files in the data store 350. The stream of data corresponding to the reply 430 may interleave information associated with the different database blocks, for example, database blocks obtained from different files may be interleaved. Hence, the program code of the point-in-time copy manager 310 processes the data stream without assuming any particular order of the database blocks received in the data stream. These database blocks may also belong to different databases.

Figure 5:
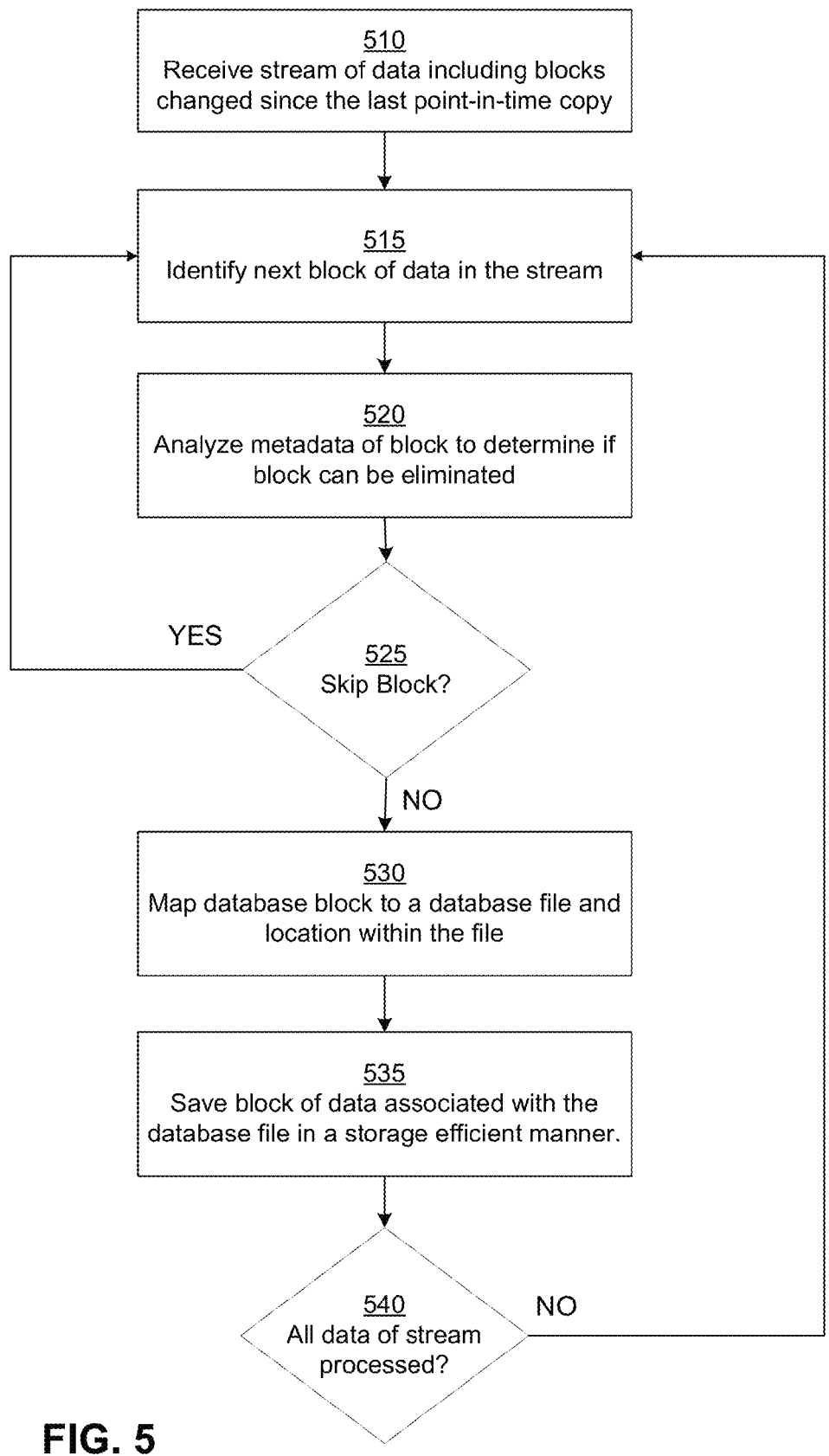
FIG. 5 is a flowchart of a process for processing a stream of data received by the database storage system from a production database system to save the data in a storage efficient way, in accordance with an embodiment of the invention.

FIG. 5 shows a flowchart of the process illustrating the processing of a stream of data received from a production database system 110 by the point-in-time copy manager 310. The point-in-time copy manager 310 receives 510 the stream of data including blocks changed since the last PIT copy. The point-in-time copy manager 310 processes the stream of data to identify 515 database blocks in the stream of data. Each database block includes metadata that contains information regarding the database block, for example, database object this block belongs to, the size of the database block, the file from which the database block was obtained, the offset within the file where the database block was stored, and a log sequence number that specifies the order in which database blocks are updated in the database in the production database system 110.

The point-in-time copy manager 310 analyzes 520 the metadata for each database block to determine if the database block needs to be stored in the storage system data store 390 or it can be eliminated. For example, the log sequence number in the metadata of the database block may indicate that even though the production system library 385 sent 430 the database block along with the data stream, the database block was never updated since the last reply 430 received from the production system library 385. Hence, the block need not be stored in the storage system data store 390 and can be skipped. Other examples of database blocks that need not be stored include temporary database blocks, session specific database blocks, and empty database blocks that have no data written in them. Another example of database blocks that need not be stored includes database blocks that are not meaningful or inaccessible to database software. Another example includes database blocks that have been marked deleted, emptied, or invalidated by database software.

In the above embodiment, the information sent 430 by the production database system 480 included unnecessary blocks that were eliminated after the data stream was received by the database storage system 100. In other embodiment, some or all of the unnecessary blocks may be eliminated while the data stream is built by the production system library 385. In this embodiment, the data stream sent 430 to the database storage system 100 by the production database system 480 is reduced in size resulting in efficient communication between the two systems.

By skipping database blocks that do not need to be stored as well as by using compression of the stored database blocks, the database storage system may achieve significant savings in terms of storage required for the database files compared to the production database system for the data corresponding to the same database. For example, the storage space occupied by the data corresponding to a production database in the storage system data store 390 may be a quarter of the space occupied by the production database in the production DB data store 350. Note that the entire information corresponding to the production database system is obtained by the first PIT copy. Subsequent PIT copies obtain only the changed information in the production DB and can be much smaller than the information contained in the first PIT copy.

If the point-in-time copy manager 310 determines 525 that a database block in the data stream can be skipped, the point-in-time copy manager 310 proceeds to identify 515 the next database block for processing. In an embodiment, the point-in-time copy manager 310 uses the database block size available in the stream metadata to identify database block boundaries in the stream of data. Each block is then processed accordingly.

If the point-in-time copy manager 310 determines that the database block in the data stream needs to be stored in the data storage system data store 390, the point-in-time copy manager 310 analyzes the database block metadata to map 530 the database block to a database file and a location within the file. The point-in-time copy manager 310 sends 435 a request to the storage allocation manager 365 to save 535 the database block. The storage allocation manager 365 stores 440 the database block in the appropriate file associated with database block in the storage system data store 390. The point-in-time copy manager 310 checks 540 if the data stream is processed completely. If there is unprocessed data remaining in the data stream, the point-in-time copy manager 310 proceeds to identify the next block of data for processing.

The storage allocation manager 365 may keep several different versions of the database block in the storage system data store 390 corresponding to the data in the database block if it is updated at different points in time. The file in which the database block is saved comprises a file header including metadata associated with the file and a sequence of database blocks. Each vendor specific database server 345 organizes the database information as a set of files that the database server 345 is capable of processing. The organization of information using the set of files for the database may be vendor specific and the database storage system incorporates the program logic to organize the database information in vendor specific organization of files. The point-in-time copy manager 310 creates a set of files structure that may be similar to the set of files of the database in the data store 350. However, the information in the storage system data store 390 may include multiple versions of the database blocks, each corresponding to updated information at different points in time. In an embodiment, the storage allocation manager 365 stores the database blocks associated with the files in an efficient manner, such that a copy of a database block is made only if the database block was updated for a point-in-time. For example, if a block B1 is updated at time T1 but not at time T2, whereas a block B2 is updated at time T1 and T2 both, the data structure of the storage system data store 390 does not keep a copy of the database block B1 for time T2 whereas it keeps a version of the database block B2 for time T2.

FIG. 4 also illustrates the interaction of the transaction log manager 320 with the production system library 385. The transaction log manager 320 retrieves incremental changes made to the transaction logs in a database in the production database system 110 since a previous time point. In an embodiment, the request 445 is sent using the secure shell or SSH network protocol. The request 445 may identify the database for which information is required and provide a time value corresponding to the previous time point the transaction log information was received. The production system library 385 sends 450 the requested information in response to the request 445 to the transaction log manager 320. The vendor interface module 335 may obtain the requested information either by calling the database server 345 APIs or by directly interacting with the data store 350, as described above. The incremental changes to the database logs obtained from the production database system 110 are saved by the transaction log manager 320 by sending a request 460 to the storage allocation manager 365 that stores 440 the information in the storage system data store 390.

Figure 6:
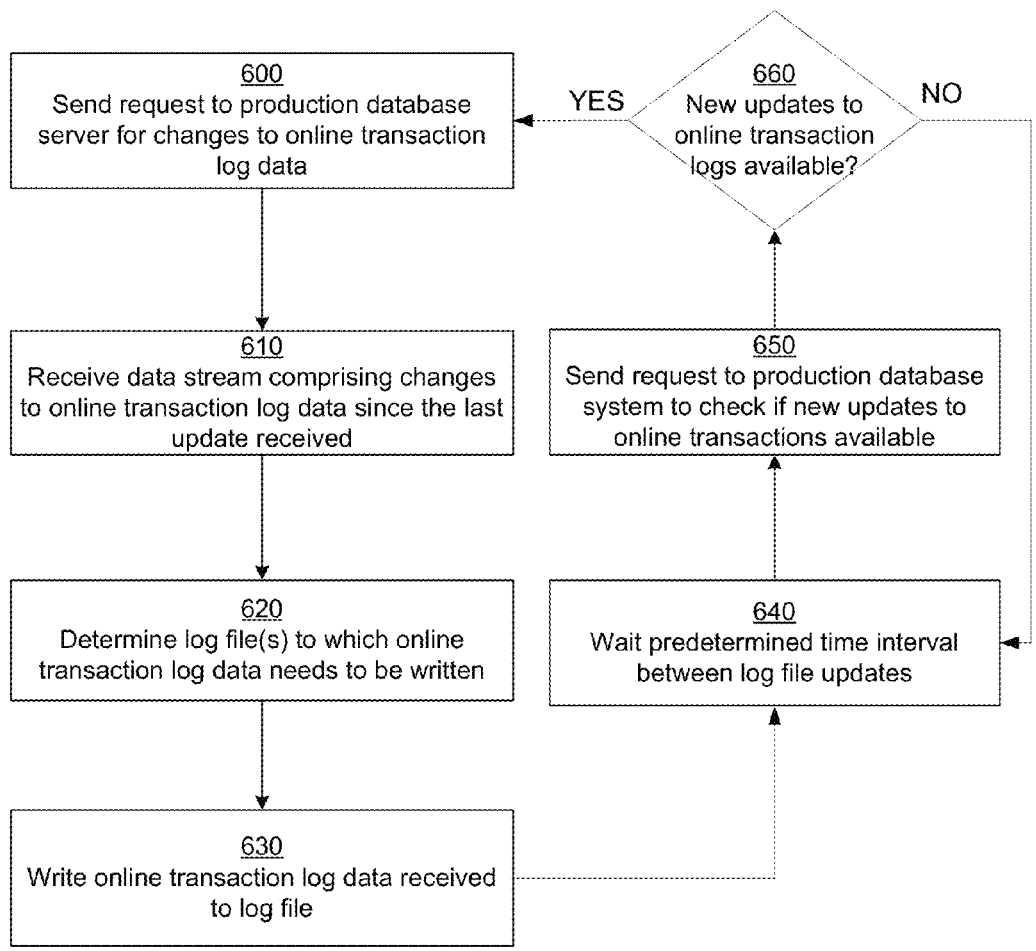
FIG. 6 is a flowchart of a process for copying the transaction log files from a production database system to the database storage system to enable provisioning of virtual databases at a given point in time, in accordance with an embodiment of the invention.

FIG. 6 shows a process for copying the transaction log files from a production database system 110 to the database storage system 100. The transaction log manager 320 sends 600 a request to the production database system 110 for retrieving the updates to transaction logs since the last update was received by the transaction log manager 320. The transaction log manager 320 receives 610 the response from the production database system 110 as a data stream. The transaction log manager 320 analyzes the data stream received to determine 620 the log file to which the transaction log data needs to be written. It is possible that the data received in a data stream needs to be written to multiple log files. The transaction log manager 320 writes 630 the online transaction log data from the data stream to the appropriate log file.

In an embodiment, the transaction log manager 320 waits 640 a predetermined interval of time between log file updates and sends 650 the next request to the production database system 110 to check if new updates to the transaction log updates are available. If no updates were made to the production database during this time interval, the production database system 110 informs the transaction log manager 320 accordingly. If no new updates to transaction log for this time interval are available, the transaction log manager 320 waits 640 for another interval of time. If the response from the production database system 110 indicates that updates to transaction logs are available, the transaction log manager 320 sends 600 the next request to the production database system 110 for retrieving the next update to the transaction logs.

The incremental changes to the transaction logs may be obtained by the transaction log manager 320 much more frequently compared to the point-in-time copy made by the point-in-time copy manager 310. For example, the point-in-time copy manager may make a point-in-time copy of a database stored in the production database system 110 once a day whereas the incremental changes to the transaction logs may be obtained by the transaction log manager 320 every five minutes. Obtaining incremental changes to the transaction logs at a high frequency provides the ability to recreate a copy of a database from the production database system 110 at a time point in between the times that a point-in-time copy is made by the point-in-time copy manager 310.

Figure 7:
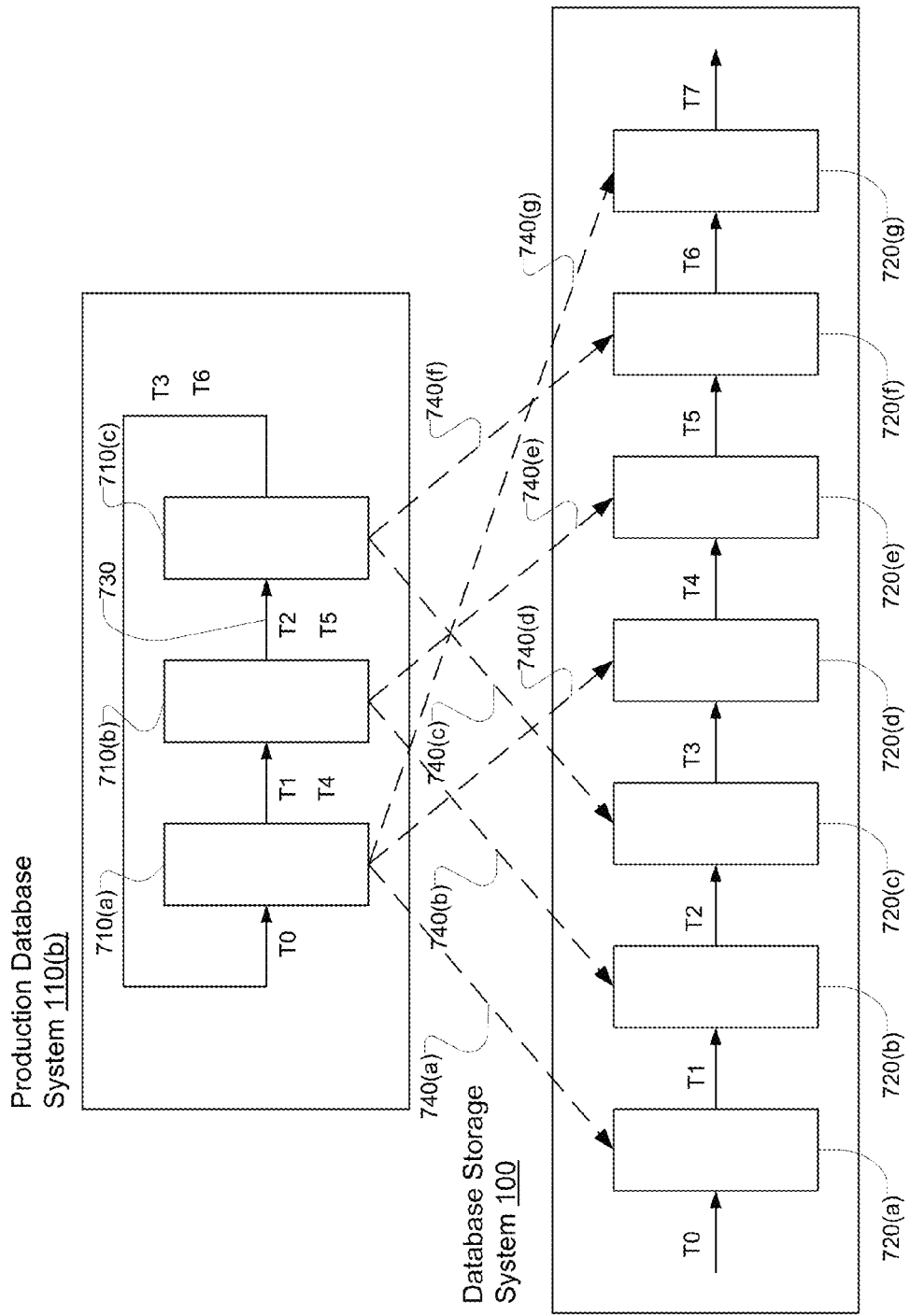
FIG. 7 is a diagram of the files used for storing the transaction logs in the database storage system compared with the production database system, in accordance with an embodiment of the invention.

The production database system 110 may reuse the transaction log files in a circular fashion, thereby overwriting the previous log files. However, the database storage system 100 creates a new log file each time it determines to close the log file to which data is currently being written to start writing to a different log file. FIG. 7 compares the log files of the production database system 110 with the log files of the database storage system 100. The log files 710 for the production database system represent online transaction log files. A limited number of files are typically allotted for storing the online transaction logs. For example, FIG. 7 shows three files 710(a), 710(b), and 710(c) allotted by the production database system 110 for storing the online transaction logs.

As shown in FIG. 7, the arrows 730 indicate a change of the transaction log file to which the transaction logs are being written by the production database system 110 at a given time T1 (the times T1, T2, T3, are assumed monotonically increasing). For example, at time T1, the production database system 110 stopped writing the transaction logs to the file 710(a) and started writing the transaction logs to the file 710(b). Similarly at time T2, the production database system 110 stopped writing the transaction logs to the file 710(b) and started writing the transaction logs to the file 710(c). At time T3, the production database system 110 stopped writing the transaction logs to the file 710(c) and decided to reuse the transaction log file 710(a). Before reusing a transaction log file, the production database system 110 ensures that the transaction logs available in the transaction log file are applied to the appropriate database. The log file changes at times T4, T5, T6 are similar to the changes described above. Hence, the production database system may typically reuse the transaction log files in a circular fashion to reuse storage.

The database storage system does not use a circular reuse strategy for log file data because the database storage system keeps the historical information for a much longer time determined by the log retention policy, based on the transaction logs. Keeping the historical information based on the transaction logs provides the ability to create VDBs for past time points. VDBs can be created for past time points as long as transaction logs necessary to reconstruct the database snapshot corresponding to the past time points are available. A strategy based on circular reuse of transaction log files results in earlier transaction logs being overwritten. Hence, a database system using circular reuse strategy for the log files can only reconstruct database snapshots based on the transaction logs for recent time points for which the transaction logs have not been overwritten.

The logs files 720 stored in the database storage system 100 are retained log files. The arrow 740 represents transfer of information from a transaction log file 710 of the production database system 110 to the retained log file 720 of the database storage system 100. Each arrow 740 may correspond to several requests 445 being sent from the transaction log manager 320 to the production database system 110 and several responses being sent 450 by the production database system 110 that are processed by the transaction log manager 320 and stored.

For example, arrow 740(a) indicates copy of information from log file 710(a) to 720(a) during the time interval T1 to T2. At time T2, the production database system started writing transaction logs to file 710(b). The database storage system creates a new log file 720(b) and arrow 740(b) indicates the transfer of transaction log information from file 710(b) to log file 720(b). The above process continues, but at time T3, even though the production database system starts reusing the log file 710(a), the database storage system creates a new log file 720(d). Arrow 740(d) indicates copy of transaction log information to log file 720(d). Accordingly, the transaction log information from the same transaction log file of the production database system 110 may be copied to multiple log files in the database storage system 100 at different times.

For example, the information in transaction log file 710(a) is copied to log file 720(a) between T0 and T1, to log file 720(d) between T3 and T4, and to log file 720(g) between time T6 and T7. The database storage system 100 avoids reuse of the log files to keep the transaction log information for as long as possible as determined by the log retention policy. This allows a user to recreate a snapshot of a database at a previous time point for which the transaction log information is available.

Figure 8:
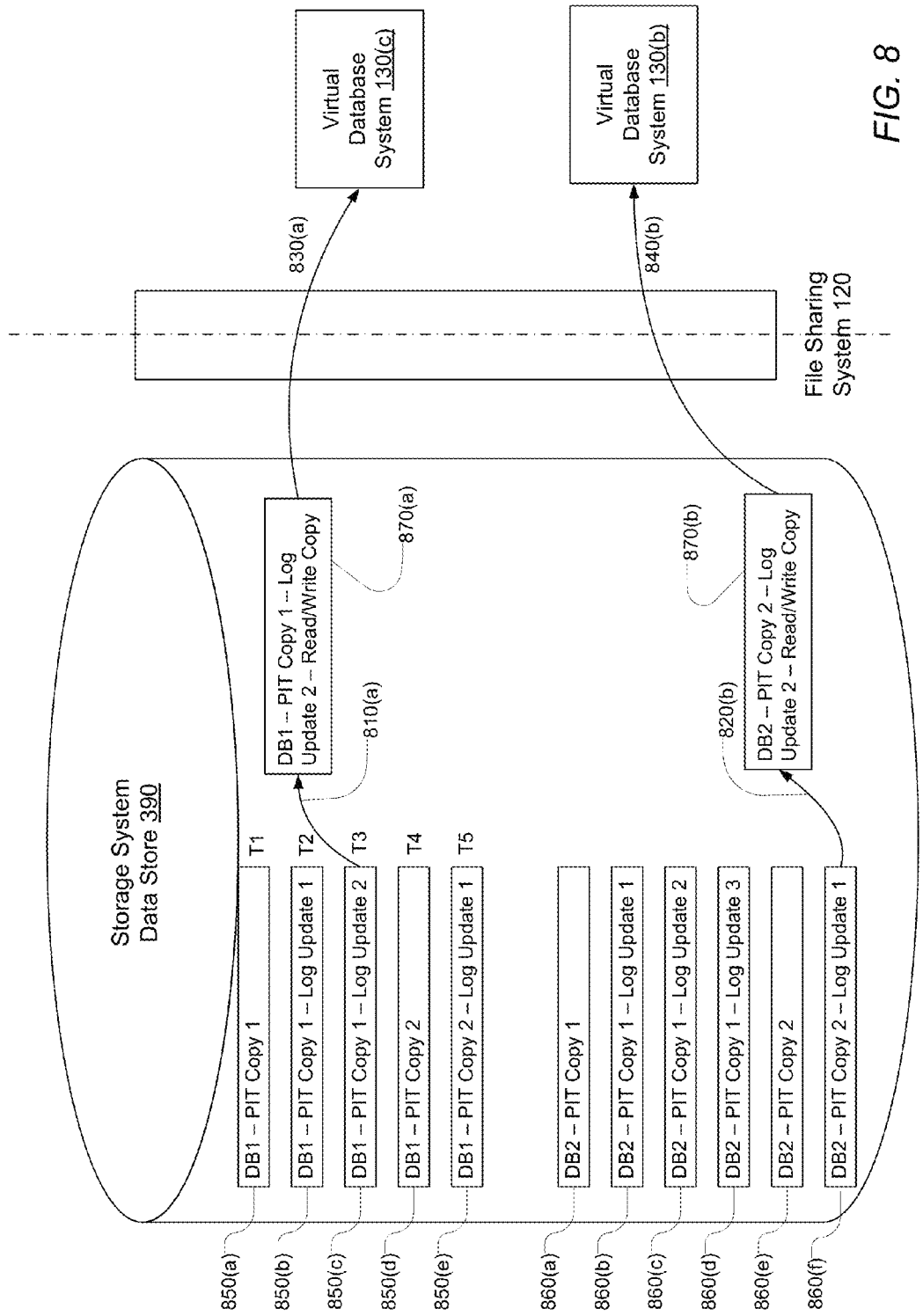
FIG. 8 is a diagram illustrating how data for a database is maintained at different points in time in the database storage system, in accordance with an embodiment of the invention.

FIG. 8 illustrates the information obtained at different points in time by the database storage system 390 from various production database systems 110 that is stored in the storage system data store 390. FIG. 8 shows information related to two databases, DB1 and DB2 obtained from the production database system 110. The information 850 correspond to data obtained for database DB1 whereas the information 860 correspond to the data obtained for database DB2. The information 850 or 860 comprises a set of database blocks and a set of transaction logs. The information 850(a) represents the first PIT copy of database DB 1 obtained from the production database system 110. The information 850(b) represents the first transaction log update for the database DB1 since the first PIT copy and the information 850(c) represents the second transaction log update for the database DB1 since the first PIT copy. The information 850(d) represents second PIT copy of the database DB1. The information 850(d) stores only the database blocks that were changed in the database DB1 since the first PIT copy was made. The information 850(e) represents the first transaction log update for the database DB1 since the second PIT copy. Similarly the information 860 correspond to the database DB2. The time T1 indicated next to a information 850 corresponds to the time that information was copied in the structure. For a PIT Copy (without log updates, for example, 850(a) or 850(d)) made by a PIT copy manager 310, the time T1 represents the time of the last update made to the database blocks before the PIT copy was made. For information corresponding to a log update, for example, 850(b), 850(c), or 850(e), the time T1 represents the time of the last transaction log in the corresponding set of the transactions logs stored.

Figure 9:
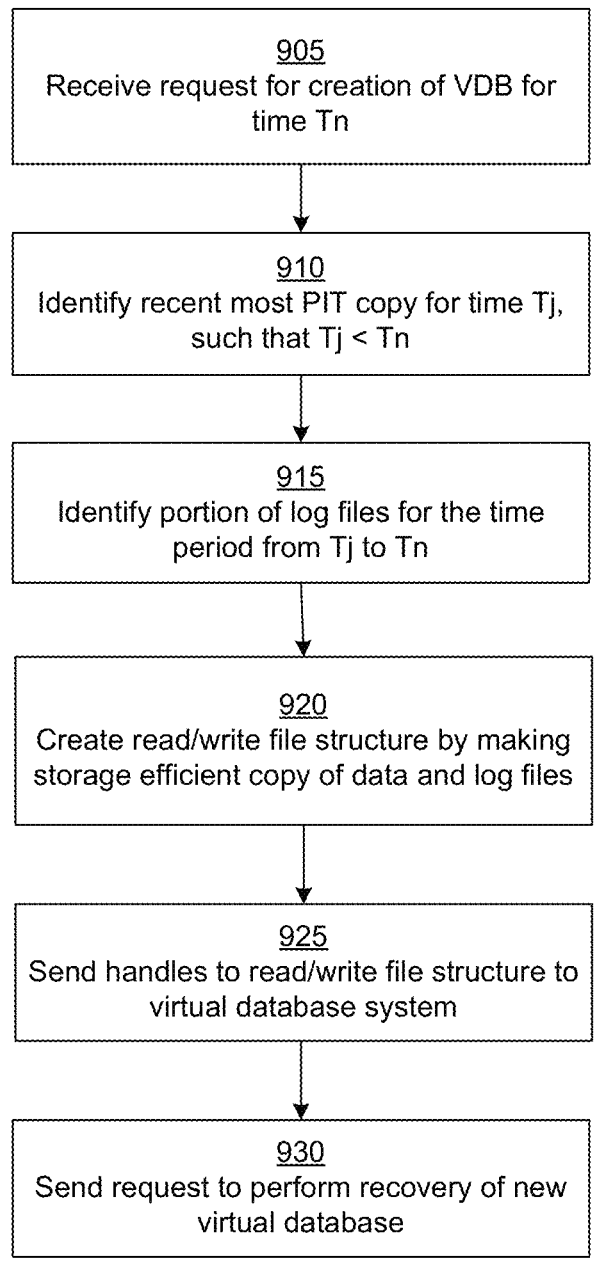
FIG. 9 is a flowchart of a process for creating a virtual database at a given point in time, in accordance with an embodiment of the invention.

The arrow 810 shown in FIG. 8 represents the step of creating the files representing a read/write copy of a database based on the information 850 as performed by the virtual database manager 375. The arrows 830 represent the step of making the files 870 available to the virtual database system 130 via the file sharing system 120. FIG. 9 is a flowchart of the process for creating a virtual database. The virtual database manager 375 receives 905 a request to create a virtual database for a Virtual Database System 130. The request to create a VDB may be received from the administration system 140. The request to create a VDB may include details of the production database system 110 and the corresponding database that needs to be made available as a VDB, the virtual database system 130 for which the VDB needs to be created, and a past time point Tn for which the database snapshot needs to be created as a VDB.

The virtual database manager 375 identifies 910 the recent most PIT copy associated with time Tj, such that Tj<Tn. The virtual database manager 375 further identifies 915 a portion of the log file updates for the time period from Tj to Tn. The read/write file structure 870 is created 920 by making storage efficient copies of the database blocks in the identified PIT copy and the appropriate portions of the log files. The appropriate transaction logs can be applied to a VDB created based on a PIT copy so as to create a snapshot of the source database for a time point that occurs after the PIT copy was made. Accordingly, even though a PIT copy may be made periodically, for example, daily, a VDB can be created for any time point in between PIT copies by appropriately applying the transaction logs to a previous PIT copy. For example, a PIT copy may have been made from a production database at midnight on a particular date. However a VDB can be created based on the state of the production database at a particular time later during the day, for example, 10:25 am, even though no PIT copy was made at that particular time. The changes in the production database from midnight to the particular time are obtained from the transaction logs.

The mechanism of making storage efficient copies of the file structure is further described herein. The virtual database manager 375 sends 935 (indicated by arrow 830 in FIG. 8) handles to the read/write file structure to the associated virtual database system 130. In some embodiments, the virtual database manager 375 makes the file structures available to the virtual database system 130 by sending a request to the file sharing manager 370. The file sharing manager 370 in response, shares the appropriate files with the virtual database system 130 using the file sharing system 120. The virtual database manager 375 also sends 930 a request to the virtual database system 130 to perform recovery 930 of the new virtual database by applying the appropriate retained logs to the database blocks. In some embodiments, the recovery of the database is automatically performed by the database when the database server starts in the virtual database system 130.

Figure 10:
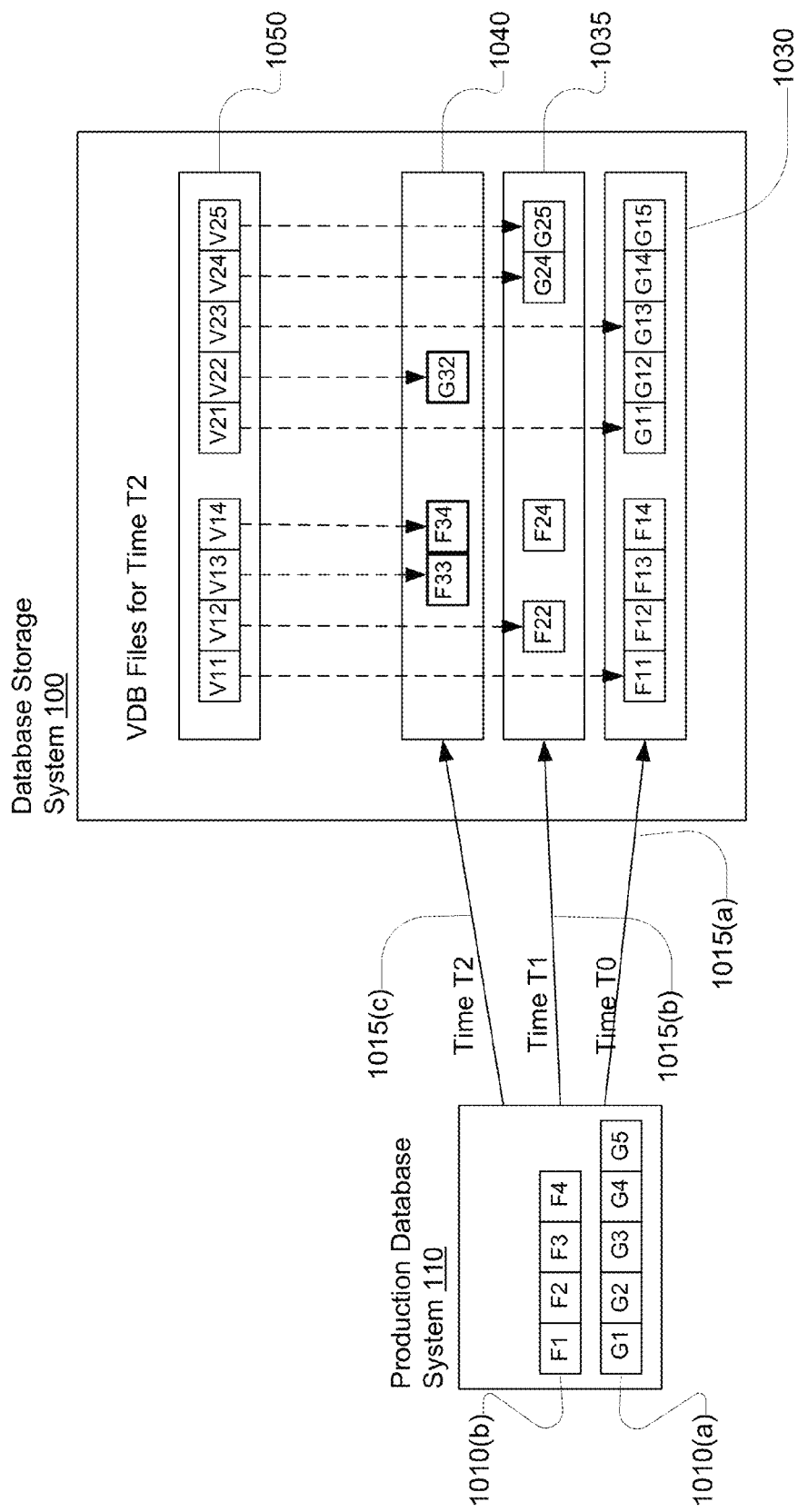
FIG. 10 illustrates the creation of a read-write copy of a database at a given point in time to provision a virtual database, in accordance with an embodiment of the invention.

FIG. 10 indicates how storage efficient copies are made to create a read/write file structure representing a VDB. As shown in FIG. 10, the structures 1010 represent the files corresponding to a database on the production database system 110. The structures Fi and Gi represent database blocks stored in the files 1010 respectively (Fi refers to F1, F2, F3, . . . and similarly Gi refers to G1, G2, G3, . . . ). The arrows 1015 represent the process of making PIT copies at different time points Ti. The first PIT copy 1030 made at time T0 needs to copy all the necessary database blocks of the database. For example, F1*i* represents a copy of block Fi and block G1*i* represents a copy of block Gi. The PIT copy 1035 made at time T1 copies only the blocks that changed since the last PIT copy and may copy much less data compared to the first PIT copy. Similarly at time T2 another PIT copy 1040 is made copying the database blocks that changed since the previous PIT copy 1035.

Assuming the PIT copy 1040 is the last PIT copy made for the configuration shown in FIG. 10, the VDB file structures 1050 are created for time point T2. When the structure 1050 are created, the blocks V11, V12, . . . , V25 may be implemented as pointers to the actual database block that stores the data. For example, V11 represents the information in block F1 and since the block F1 was never updated during copies made at time T1 and T2, V11 points at F11. V12 represents the information in block F2 and since F2 was updated at time T1, V12 points at the block F22. Similarly, V13 corresponds to block F3 that was updated at time T2 and points at the block F33.

Figure 11:
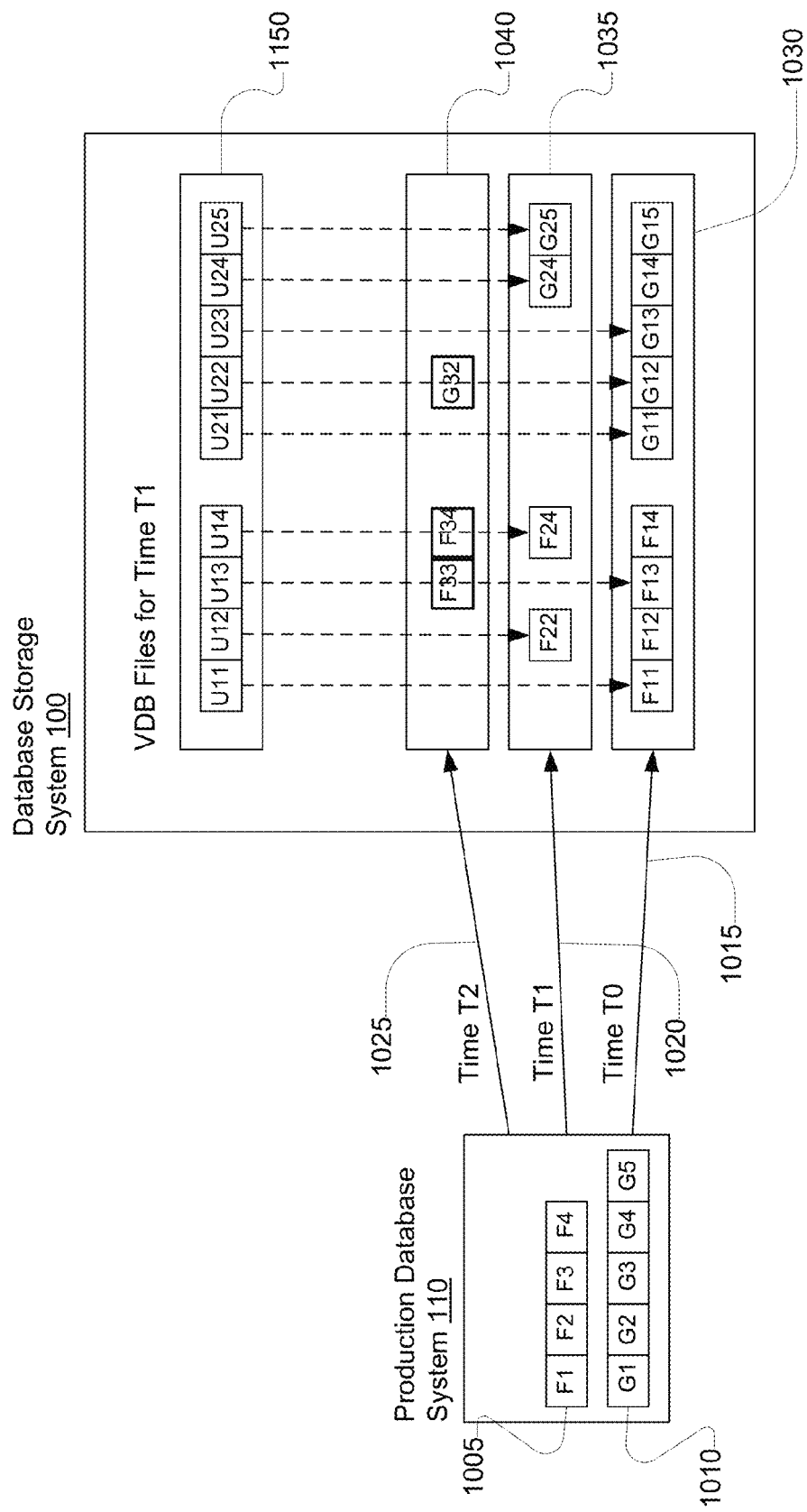
FIG. 11 illustrates the creation of a read-write copy of a database at a different point in time compared to FIG. 10 to provision a virtual database, in accordance with an embodiment of the invention.

FIG. 11 illustrates the file structures 1150 created for time point T1. Note that U13 corresponding to block F3 points at F13 since the block F3 was never updated for time point T1. Also, U14 points at block F24 corresponding to block F4 copied at time T1. None of the structures in 1150 point at PIT copy 1040 since the PIT copy 1040 was made after the time point T1.

Figure 12:
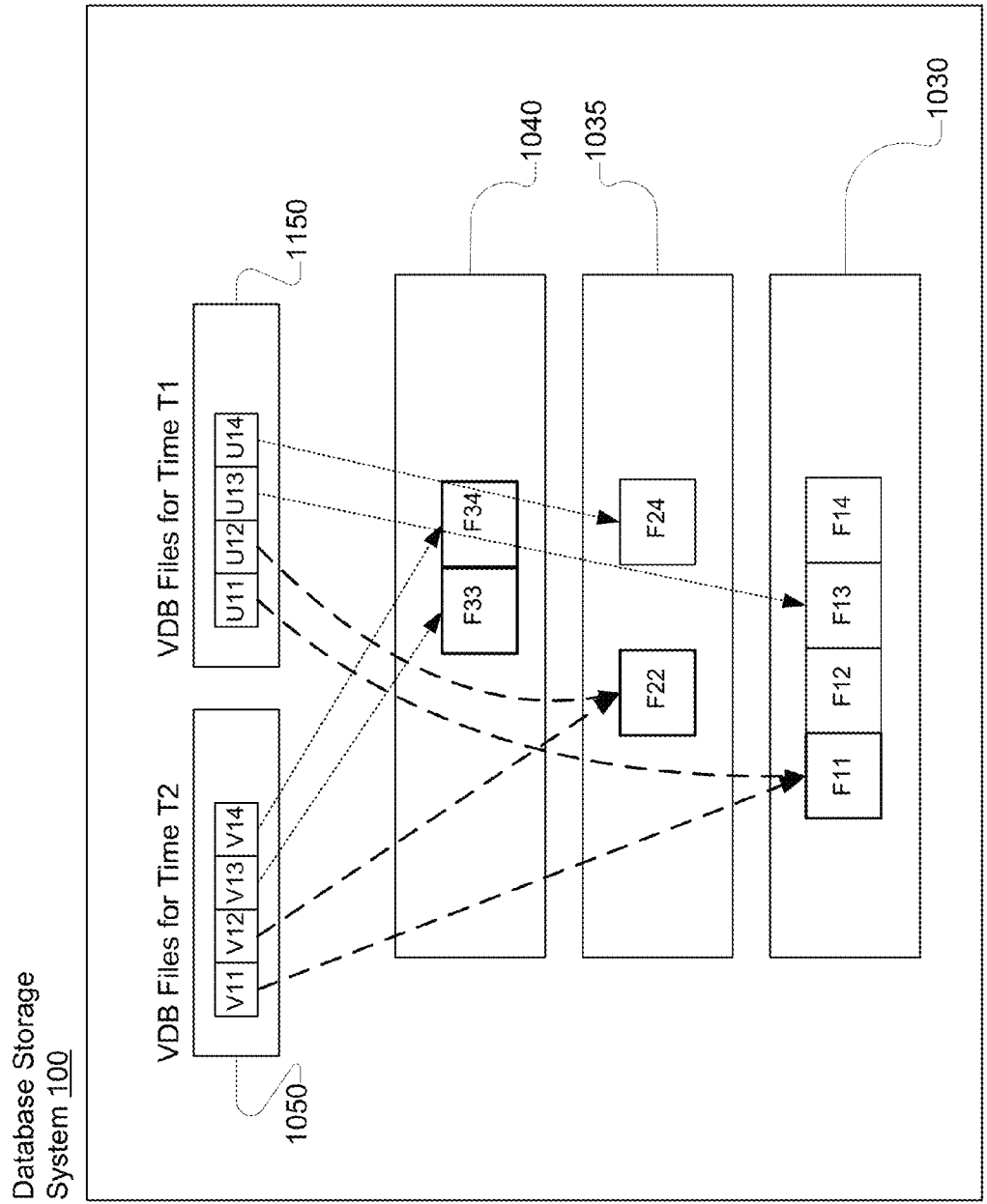
FIG. 12 illustrates how database blocks stored on the storage system data store may be shared by file structures created for different VDBs, in accordance with an embodiment of the invention.

FIG. 12 illustrates how database blocks stored on the storage system data store 390 may be shared by file structures created for different VDBs. FIG. 12 shows the file structures corresponding to the file 1005 of the production system database 110 created for VDBs as illustrated in FIG. 10 and FIG. 11. As shown in FIG. 12, the block V13 and V14 of the file structure C50 point at the latest copy of the blocks F33 and F34 that are not shared with the VDB files 1150 for time T1. However, block V11 of VDB files 1050 at T2 shares block F11 with block U11 of VDB files 1150 at T1. Similarly block V12 of 1050 shares database block F22 with block U12 of 1150. The sharing of blocks across multiple VDBs results in efficiently utilization of data stored in the storage system data store 390. In case, one of the VDBs attempts to write to a shared database block, a copy of the shared database block is made for the VDB attempting to write. The remaining VDBs that shared the database block continue to share the original database block. Accordingly, any changes to the copied database block are not visible to the remaining VDBs since the changes are specific to the VDB that is writing to the database block.

A VDB may be created using a point-in-time copy of another VDB as a source. For example, assume VDB1 is created and provisioned to a virtual database system 130. Database blocks associated with the VDB are copied when the virtual database system 130 writes to the database blocks for the first time. Point-in-time copies of VDB1 are also made based on a predefined schedule. This allows a user to create a second virtual database VDB2 based on a point-in-time copy of VDB1. Transaction logs of VDB1 are also stored, allowing a user to create the second virtual database VDB2 based on any previous state of VDB 1 that may be in-between point-in-time copies of VDB1.

Figure 13:
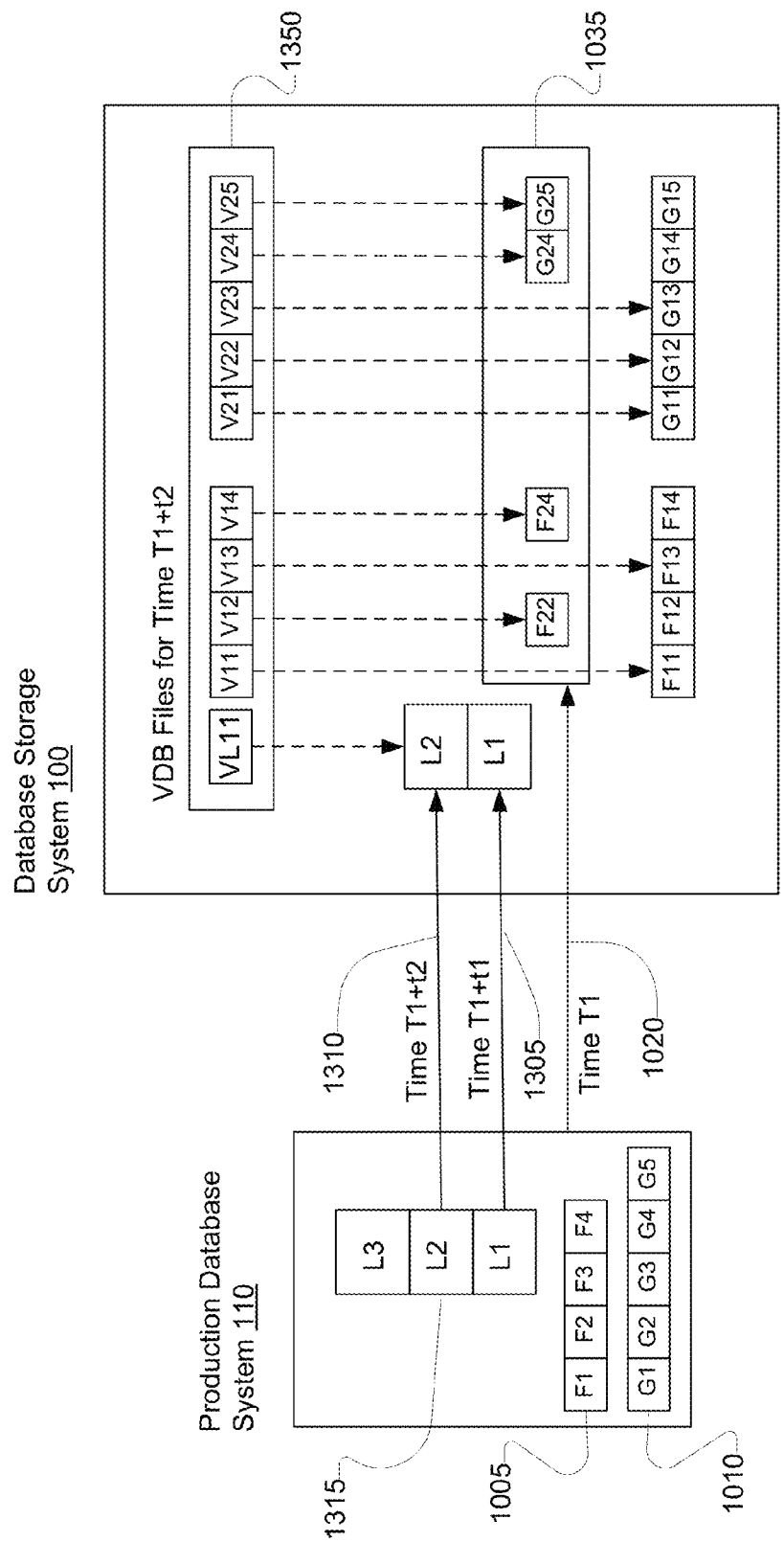
FIG. 13 illustrates the creation of a read-write copy of a database for provisioning a virtual database based on transaction logs copied from the production database system, in accordance with an embodiment of the invention.

FIG. 13 further illustrates incorporation of log files in the VDB file structures 1350 that corresponds to a database snapshot for a time point T1+t2 that occurs before T2. As shown in FIG. 13, the log file data L1 is copied by the transaction log manager 320 at time T1+t1 and the log file data L2 is copied at time T1+t2. Additional log data L3 written in the production database system 110 is not shown copied to the database storage system and may be copied at a time after T1+t2. The file structure 1350 created for a VDB includes structure VL11 that points to the appropriate log file data representing the log information copied between time T1 and T1+t2, represented by L1 and L2. When the database server at the virtual database system 130 starts, the logs pointed at by structure V11 may be applied to the database blocks 1035 using the database recovery process.

Since the structure 1050 illustrated in FIG. 10, structure 1150 illustrated in FIG. 11, or structure 1350 illustrated in FIG. 13 are read/write structures, the virtual database system 130 is allowed to read from these structures as well as write to them. When the virtual database system 130 writes to a block Vij, space is allocated for the database block and the data of the corresponding database block copied to the space allocated. For example, if the virtual database system 130 writes to the block V11, space is allocated and block F11 copied to the allocated block. Hence the original copy of the block F11 is maintained as a read only copy and the virtual database system 130 is allowed to write to a copy of the appropriate database block created specifically for the virtual database system 130. This can be considered a lazy mechanism for creating copies of the database blocks that copies a database blocks only if the corresponding virtual database system 130 writes to the database block. Since the number of blocks that a virtual database system 130 writes to may be a small fraction of the total number of blocks associated with the VDB, the above structure stores the data associated with the VDB in a highly storage efficient manner. A database block that is not written to by virtual database systems 130 may be shared by several virtual database systems without being copied for a specific virtual database systems 130.

VDB Operations

Figure 14:
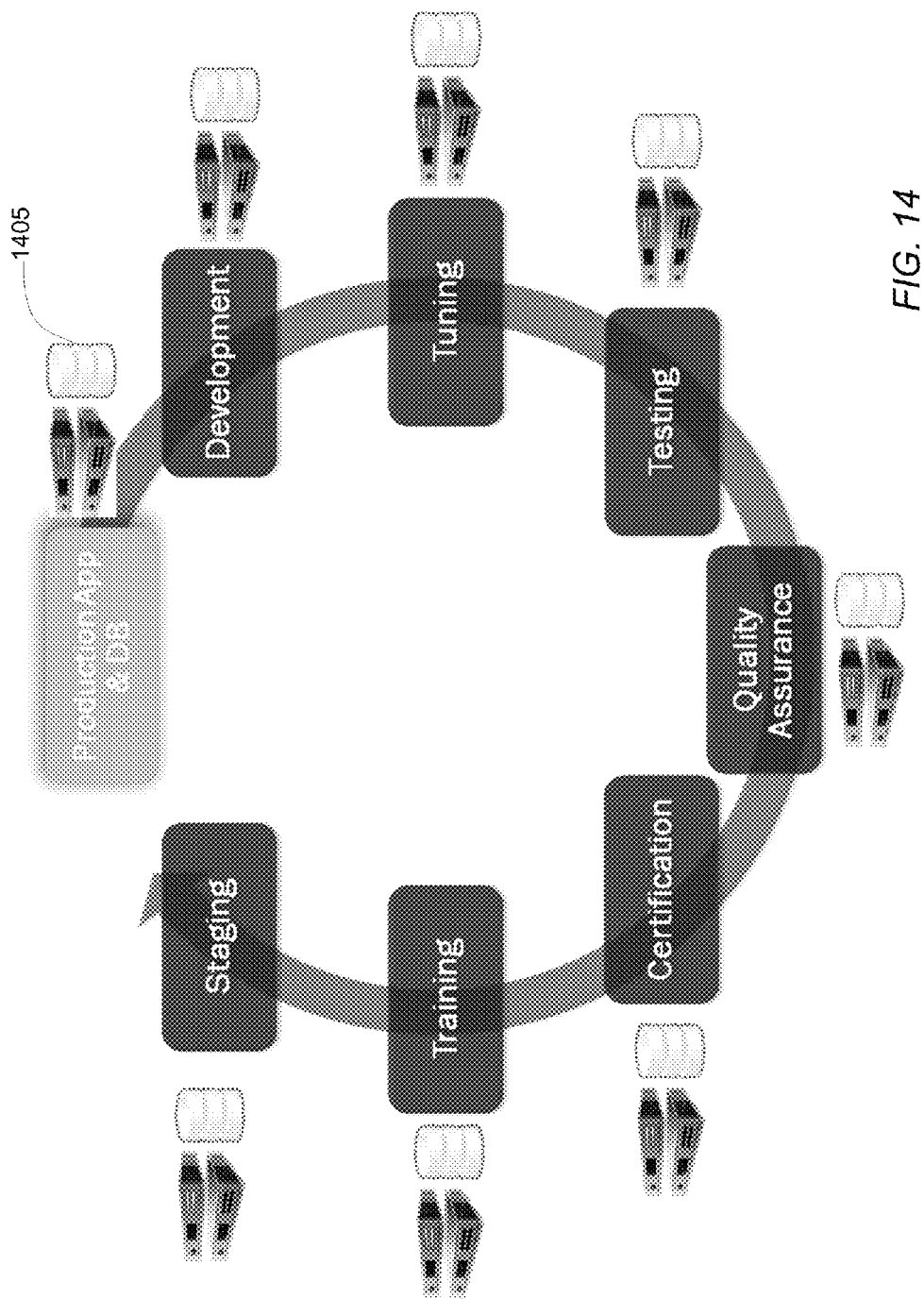
FIG. 14 illustrates the life cycles of a database in a workflow for making changes to the database or to applications that depend on the database, in one example environment.

FIG. 14 illustrates an example of the life cycles of a database in a workflow for making changes to the database or to applications that depend on the database. As shown in FIG. 14, copies of a production database 1405 may be made for several purposes including development, tuning, testing, quality assurance, certification, training, and staging. Making copies of large databases by conventional means can be a slow process. Furthermore, running different copies of databases on different machines results in inefficient usage of the hardware. Various workflow scenarios associated with databases can be simplified and made highly efficient by creating virtual databases instead of making physical copies of the databases. Multiple virtual databases can be stored in a database storage system 100 and the available resources of the system can be utilized efficiently.

The steps performed in a workflow scenario based on VDBs can be significantly different from the operations performed for the same workflow scenario using conventional systems. These steps may be executed by a database administrator of the database storage system 100 or executed automatically using a script. Various operations associated with a virtual database are described below.

The link operation provides information necessary to access a database on a production database system 110 to the system configuration manager 315 of the database storage system 100. The information necessary to access the database enables the database storage system 100 to retrieve data from the production database system 110. The information may include the name of the database, network address of the production database system 110 hosting the database, and access control information. As part of the linking operation, the database storage system may communicate with the production database system 110 to validate the information of the database. The database storage system 100 can retrieve database blocks from the linked database in the production database system 110 and store them in the storage system data store 390. The database blocks stored in the storage system data store 390 can be used to create virtual databases. In some embodiments, linking may specify that only a part of source database needs to be copied rather than the whole source database. For example, in relational databases a part of the source database could be a table space, a set of one or more tables, a subset of a table, or a set of subsets of tables. In an embodiment, a user can specify a script for computing a part of a database.

The load operation retrieves data from a database of the production database system 110 for storage in the database storage system 100. The database needs to be linked to the database storage system 100 before the database can be loaded. If the load operation is retrieving the data of the database for the first time, the entire data available in the database is retrieved. As a result, the first load operation can be slow and may take several hours or days depending on the size of the database and the network bandwidth based on state of the art hardware. Subsequent load operations may take significantly less time since they retrieve only changes in the database since a previous load operation. The load operation is performed periodically to obtain the changes to the database on an ongoing basis. The load operation may obtain database blocks of the database and/or transaction logs representing updates to the database since a previous point in time. The input required for the load operation includes information identifying a previously linked database. If only a part of the source database is specified in linking, only that part will be loaded.

The load operation can also incrementally update information available in a VDB. The information obtained from the production database system 110 by a database storage system 100 may be updated periodically. As the information obtained from the production database system 110 available in the database storage system is updated, the information provisioned to the virtual database system 130 can also be updated. It is possible that the data in the VDB is updated by the virtual database system 130. In this case, the incremental load identifies the updates made by the virtual database system 130 and compares them with the changes retrieved from the production database system 110. If there are no conflicts in the two sets of updates, the load operation can succeed by applying the changes of the production database system 110 to the VDB. If there are conflicts, a report of the conflicts may be presented to a database administrator and input requested from the database administrator to help resolve the conflicts. In one embodiment, the conflicts between the updates from the two sources are detected by identifying the database blocks affected by the two updates. If there is no overlap between the database blocks of the two sets of updates, the database storage system 100 determines that there are no conflicts. If only part of source database is specified in linking, only changes to that part will be loaded.

The provision operation creates a virtual database in the database storage system 100 and makes it available to a virtual database system 130. The virtual database may be created based on a point-in-time copy of a source database or a point-in-time copy of another virtual database. One or more read/write files may be created for the VDB and shared with the virtual database system 130 using the file sharing system 120. The read/write files include structures that point to database blocks stored in the storage system data store 390. The input required for the provision operation includes information identifying a previously linked and loaded database or an existing VDB, a previous time point corresponding to the desired state of the database, and information identifying a virtual database system 130 for which the virtual database is being provisioned. In some embodiments, a part of a VDB could be provisioned. Similarly, parts from different VDBs may be provisioned together to form a new VDB. In other embodiments, several VDBs may be provisioned together as a group using application specific coordination scheme. These group oriented provisioning may involve provisioning or coordination of provisioning of application logic or configuration.

The bookmarking operation marks an application significant point in time in one or more virtual databases. The resulting "bookmark" can be used to direct provisioning operation. Typically, the operation is triggered by user or external program through administration system 140. Database storage system 100 returns a token as the resulted "bookmark" is stored in database storage system 100. Later, user or external programs can provision the VDB or the group of VDBs to the same application significant point in time using returned token. For example, an external program may wish to capture production database in certain state, such as right after a massive batch processing run. User could invoke bookmarking operation via administration system 140 and save returned token. Later, user can provision the VDB to the same state by supplying saved token. In some embodiments, tokens are in the form of string.

The refresh operation corresponds to the database storage system 100 periodically updating a VDB based on the latest information from the source database system 110. For example, a VDB may be used for a reporting system that generates report for users to view. The refresh operation automatically loads the latest information periodically from a production database system 110, for example, daily. The VDB being refreshed is shutdown. The VDB is updated with the latest point-in-time copy of the production database system 110 and the VDB restarted. Accordingly, the users of the corresponding virtual database system 130 see the latest reports based on the latest point-in-time copy of the data in the production database system 110. In an embodiment, the VDB may also be refreshed based on transaction logs obtained in between point-in-time copies obtained from production database system 110. The input required for a refresh operation includes information identifying a VDB to be refreshed and a schedule for refreshing the data.

The pre-script operation corresponds to execution of special purpose instructions that perform specific tasks before performing another database storage system 100 operation. For example, a pre-script operation may be performed before provisioning a VDB or a load of a database from the production database server 110. A database may be used along with applications that require application specific data stored outside the database. When the database is refreshed or loaded, a pre-script operation can be executed to load the application specific data to the database storage system 100. The input to the pre-script operation may include an executable script specifying the operations to be performed and details of the database storage system 100 operation before which the pre-script operation is performed.

The post-script operation corresponds to execution of special purpose instructions that perform specific tasks after performing database storage system 100 operation. For example, a post-script operation may be performed after provisioning a VDB to a virtual database system 130. Testing and development of an application using the database in the production database system 110, can be performed by running a similar application using a testing or development virtual database system 130. In this scenario, the application specific data copied from the production database server 110 by the pre-script operation may have to be further copied to the virtual database system 130 that runs a corresponding application. The instructions for copying the application specific data from the database storage system 100 to the virtual database system 130 are executed as a post-script operation after the provision operation. The input to the post-script operation includes an executable script specifying the operations to be performed and details of the database storage system 100 operation after which the post-script operation is performed.

The pre-script and post-script operations can be associated with various VDB operations. For example, pre-script operation can be performed before a refresh operation and a corresponding post-script operation performed after the refresh operation to allow copy/installation of specific information before/after the refresh operation. Similarly, pre-script/post-script operations may be associated with other VDB operations including link, load, provision, and export among other operations. For example, during linking or loading data from a source database, pre-scripting/post-scripting operations allow scrubbing of data by using compression, masking, or removing data including columns or rows of database tables. Pre-scripting and post-scripting allows dealing with application data associated with applications using the source database and/or the VDB. Pre-scripting and post-scripting allows management of system environment issues associated with provisioning of VDBs and allows starting/stopping activities before/after a VDB is provisioned.

The share operation corresponds to granting permission to another user in order to allow the user to access a VDB. In an embodiment, the share operation may include the step of creating a new VDB and provisioning it for sharing with a new user or a set of users. For example, in a test and development environment, after reaching a particular stage of development using a VDB, the VDB may be shared with test users. The input required for a share operation may include information a VDB to be shared, information identifying users with whom the VDB is shared and access control information identifying the level of permissions granted to the users.

The export operation copies the information available in a database from one computer to another. Typically the information is copied to a target computer for assembly as a database. A stage operation corresponds to an export operation that copies the database information to a staging server. A staging server is typically used for performing system level testing of a database before using changes made to the database or to a database application in a production environment. The input to the export operation includes, information identifying the VDB to be exported and information identifying the target machine to which the data from the VDB needs to be exported.

The mask operation corresponds to altering or skipping specific information in a database when the information in the database is being copied. For example, when a copy of a database is made, sensitive information in the source may not be copied to the target. Another example is that data is scrambled when database is provisioned. Examples of sensitive information include credit card information or social security numbers. Example scenarios where database information is masked include making a copy of a production database for testing purposes. Users of the database that perform testing using a VDB may not need the sensitive information stored in the production database system 110. Other operations that can transform data being copied from a source database include compress and encrypt. The compress operation transforms the data by preserving the original information but the converting the format of the data so that it occupies less space when stored. The encrypt operation transforms the data to a format that cannot be read by applications that do not have the logic to decode the encrypted information. The inputs to the mask, compress, or encrypt operations include information identifying a source VDB and a target database. The target database may itself be a VDB or the data can be exported to a conventional system.

The purge operation deletes information not needed from a VDB. Typically information is purged when it occupies large amount of space and is not needed anymore. For example, a database may be storing event data associated with events occurring in a system over a long period of time. Old data that is not needed any more or data that has been archived can be purged from the database. The purge operation can be performed when the database information is copied by skipping the information to be purged from the copy operation. The inputs for a purge operation can include information identifying a source VDB and a target database. The target database can be a VDB or it can be a conventional database.

The extract, transform, and load (ETL) operations refers to typical operations performed in a data warehousing project. The extract step retrieves data from a source, the transform step modifies the data based on certain operational needs and the load operation loads the data to a target system. The input required by the ETL operations includes information identifying a source database, information identifying a target database, and operations to be performed for transformation of the data. The inputs for the ETL operation can include information identifying a source VDB and a target database. The target database can be a VDB or it can be a conventional database.

The replicate operation transfers changes from the data stored in a source storage system to a target storage system. The data being replicated can either be a VDB or the data stored in the storage system data store 390, corresponding to the database blocks obtained from one or more production database systems 110. The source and target storage systems need to be setup appropriately for the replicate operation. Program code for replication on the source storage system may periodically identify the changes in the data stored in the source storage system and send the changes to the target storage system. Similarly, program code on the target storage system may receive the changes form the source storage system and process them appropriately to incorporate the changes. Replication can be used for high-availability by mirroring the data from the source storage system to the target storage system. The target storage system is available for use in case the source storage system becomes unavailable for some reason. The inputs for the replicate operation may include information identifying a source system and a target system.

The backup operation creates a copy of the data available in a storage system such that the backup copy of the storage system can be used to reconstruct information of the original storage system in case the original data is lost. The restore operation recovers the information available in the backup copy and reconstructs the information. Note that any changes in the original storage system since the backup was created may be lost, unless the update information is saved in some format. In some embodiments, the backup information is stored on large storage systems with possibly slow retrieval speed, for example, tape backup systems.

Other VDB operations based on the concepts defined herein can be defined and used for datacenter workflow automation. VDB operations can also be created by combining existing VDB operations. Different workflow scenarios that utilize the above operations based on VDBs or database storage systems 100 are described below. For each workflow scenario, a brief description of the scenario based on conventional systems is compared with the scenario based on virtual databases.

Test and Development Workflow

Figure 15:
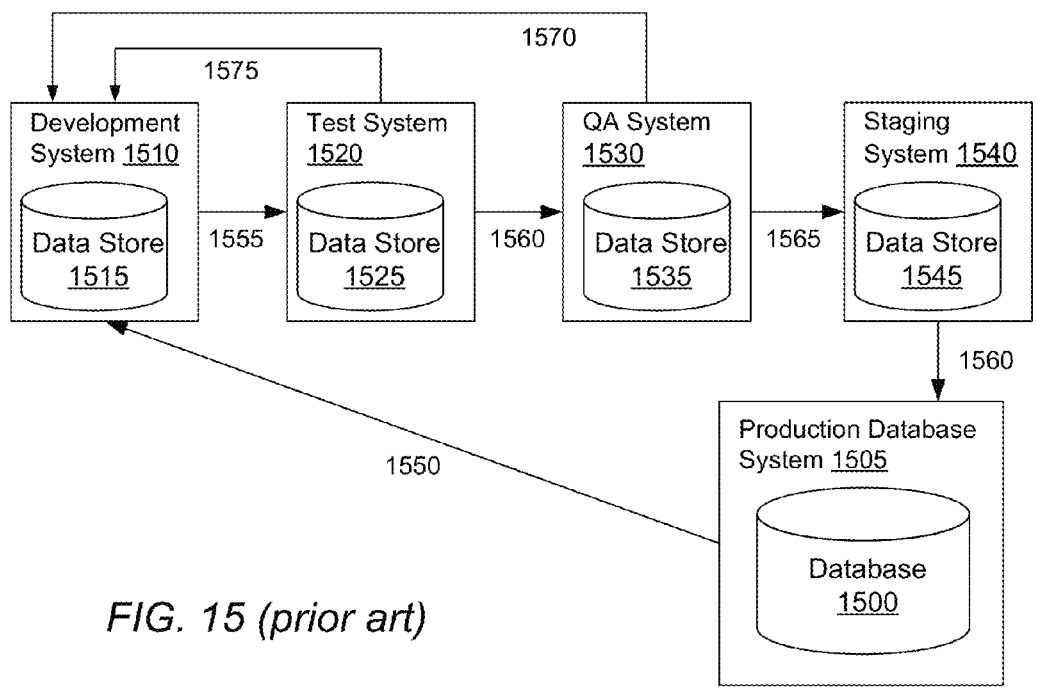
FIG. 15 illustrates a system environment for implementing a workflow for testing and development of program code related to databases and database applications using conventional methods.

FIG. 15 illustrates a scenario for a test and development workflow based on a production environment using conventional databases. As shown in FIG. 15, the production database system 1505 includes a database 1500 used in a production environment. Testing and development of software used in the production environment by conventional systems may require multiple copies of data stored in the database 1500. As shown in FIG. 15, the database 1500 is copied 1550 to the data store 1515 of a development system 1510. Development activities may be performed on the development system 1510 for certain period of time. Periodically, the database in data store 1515 is further copied to a data store 1525 in a test system 1520 for performing testing of the software and/or the database. Issues found in the test system 1520 may provide feedback 1575 that may require further development activities. The process of development and testing may be repeated multiple times. At certain stage, the database may be copied from the test system 1520 to the data store 1535 of the quality assurance (QA) system 1530 for quality assurance that may include testing of performance, system integration, certification, and user acceptance. Feedback 1570 based on QA system 1530 may require further development using the development system 1510. The overall process of development, testing and QA may be repeated multiple times. When satisfactory QA testing is performed, the database may be further copied to the data store 1545 of a staging system 1540. The final changes in the software or database are propagated 1560 to the production database system 1505, for example, via an upgrade procedure.

Figure 16:
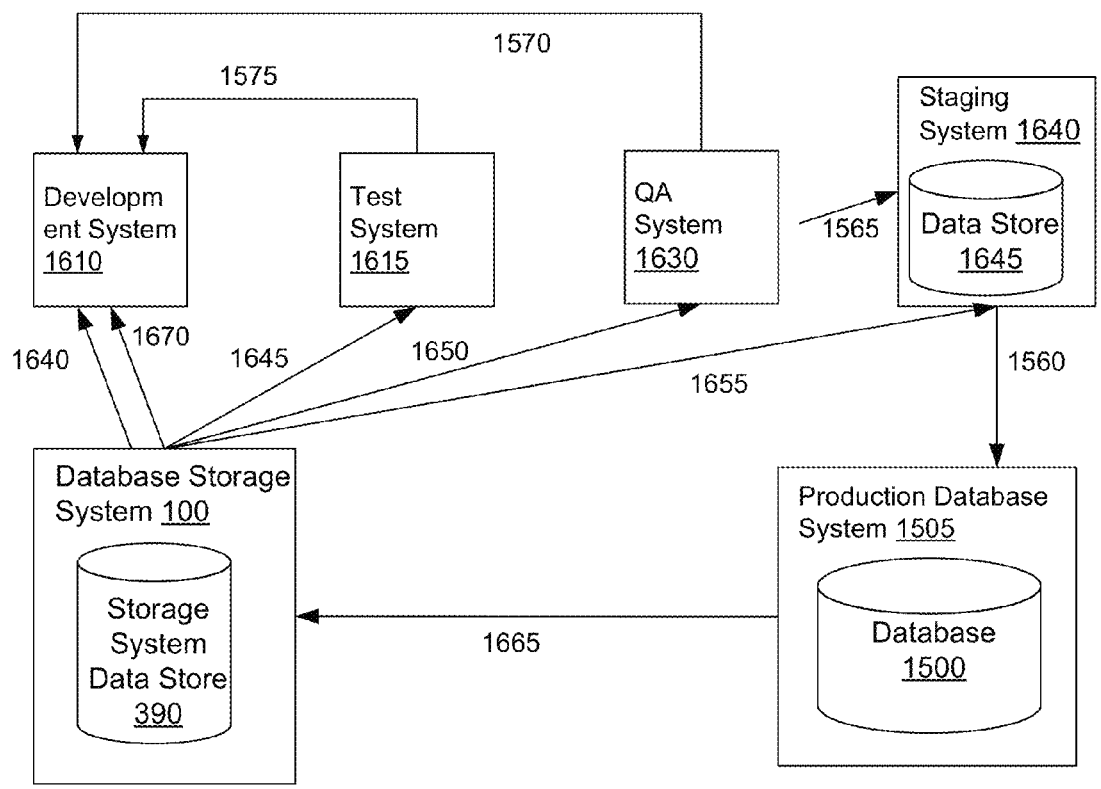
FIG. 16 illustrates a system environment for implementing a workflow for testing and development of program code related to databases and database applications using VDBs, in accordance with an embodiment of the invention.

FIG. 16 illustrates the scenario for the test and development workflow based on virtual databases. Several steps requiring copies of database made by the workflow described in FIG. 15 are eliminated as a result of the use of virtual databases. A database 1500 from the production database system 1505 is linked and loaded 1665 to the database storage system 100. A virtual database corresponding to the database 1500 is provisioned 1640 to the development system 1610. The virtual database created for the development system 1610 can be refreshed 1670 multiple times based on a schedule. When the development activity on the VDB reaches a particular stage, the VDB is shared with a test system 1615, thereby providing appropriate access to the users of the test system 1615. Sharing of the development VDB with the test VDB may involve creating a test VDB based on a point-in-time copy of the development VDB. Feedback 1575 provided by the test system 1615 may require repeated provision 1640, refresh 1670, and share 1645 operations. When the development and testing reaches a particular stage, the VDB is further shared 1650 with a QA system 1630 and stored in the data store 1635. Sharing of the test or development VDB with the QA system may require creating a QA VDB based on a point-in-time copy of the corresponding test/development VDB. Alternatively, the development VDB is exported to the QA system. A VDB may also be staged 1655 directly to the data store 1645 of the staging system 1640.

In some organizations, different activities involved in a workflow may be performed by different physical locations. For example, production server may be located in one site of the organization whereas development and testing may be performed in another site of the organization. The other site performing development and testing may be offshore, resulting in slow network communication between the two sites. In this scenario, the development system 1510 and test system 1520 shown in FIG. 15 may be available on one site and the remaining systems including the production system 1500, the QA system 1530, and the staging system 1540 on a different site.

Figure 17:
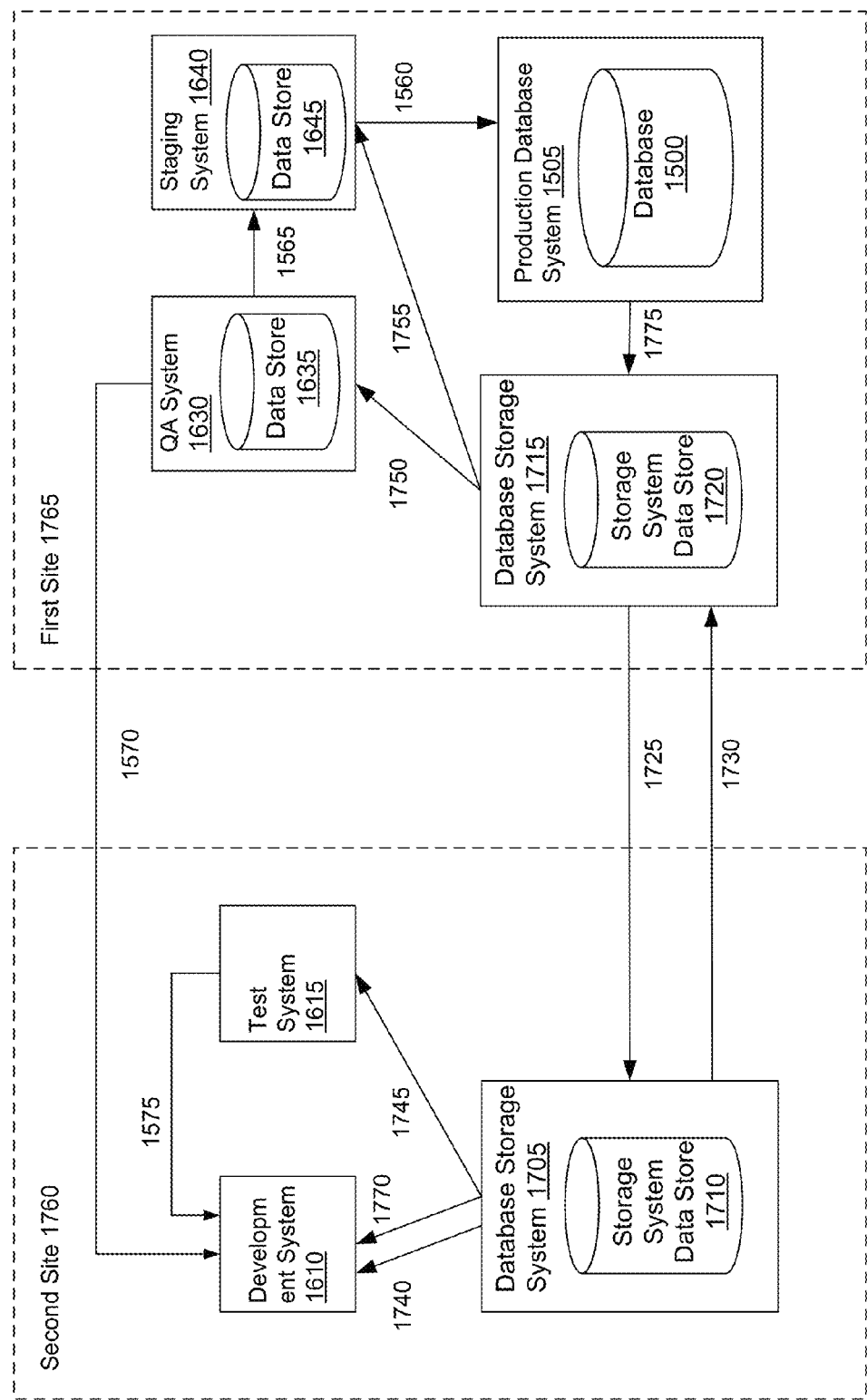
FIG. 17 illustrates a system environment for implementing a workflow for a multi-site testing and development of program code related to databases and database applications using VDBs, in accordance with an embodiment of the invention.

FIG. 17 shows the interaction between the various systems for this scenario. As shown in FIG. 17, the sites are named first site 1765 and second site 1760. A database storage system 1715 is available on the first site 1765 and a second database storage system 1705 is available in the second site 1760. A database stored in the production database system 1505 is linked and loaded 1775 into the database storage system 1715 in the first site 1765. The data corresponding to the database is replicated 1725 from database storage system 1715 to the database storage system 1705. The replication operation 1725 may also be combined with other operations including masking, purging, compression, and encryption. The information may have to be masked and purged since the development/testing may be offshore and the users in the second site 1760 may not have access to specific information available in the production database. The information may also be compressed to reduce the time taken to transfer the data over the network and encrypted to avoid the data being stolen. The database is provisioned 1740 and refreshed 1770 for the development system 1610 and shared 1745 with the test system 1615 as necessary. Changes made to the database stored in the storage system data store 1710 as a result of the testing and development can be propagated back to the database storage system 1715 and stored in the storage system data store 1720. The propagation of these changes can be performed via a replication 1730 operation that can be combined with compression and encryption. The updated database in database storage system 1715 is exported 1750 to the QA system 1630 and/or exported 1755 to the staging system 1640.

Backup and Restore

Figure 18A:
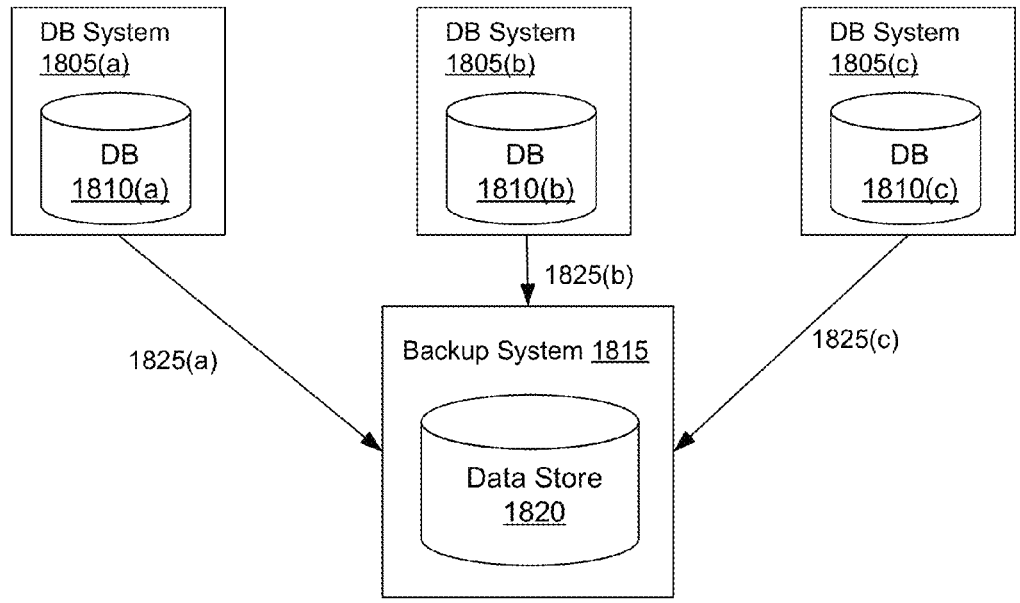
FIG. 18a illustrates a system environment for implementing a workflow for backup and recovery of databases using conventional methods.
Figure 18B:
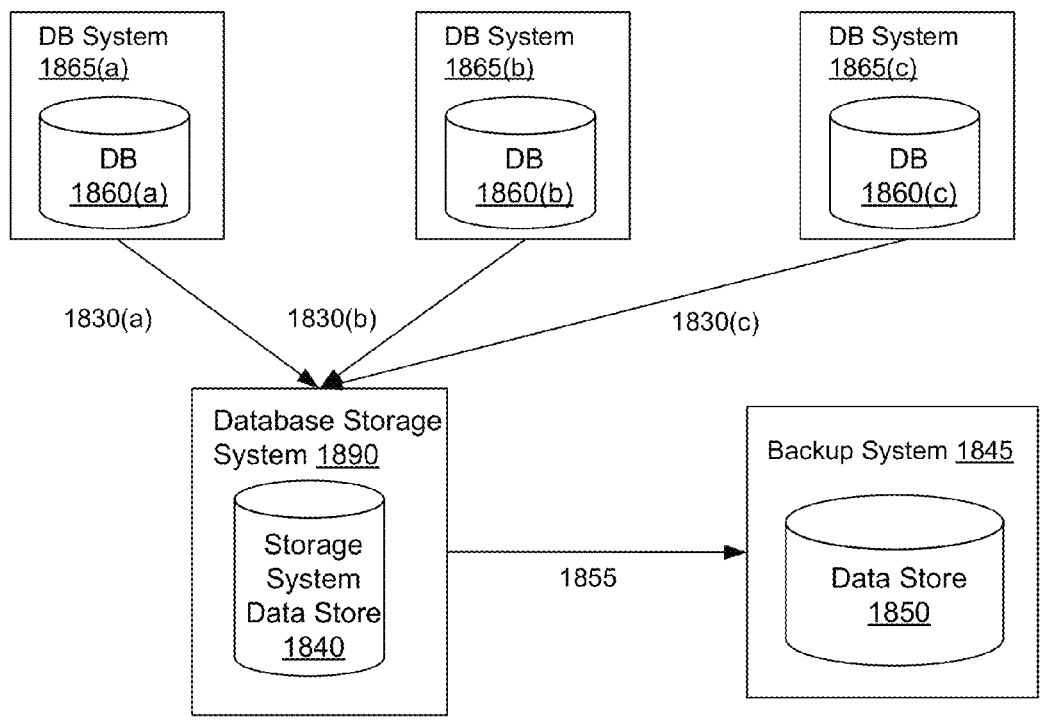
FIG. 18b illustrates a system environment for implementing a workflow for backup and recovery of databases using VDBs, in accordance with an embodiment of the invention.

FIG. 18(*a*) illustrates the scenario for backup and restore of databases. There may be multiple database systems 1810 in an enterprise that are copied 1825 to the data store 1820 of the backup system 1815. The backup system 1815 may store the backup data in persistent memory, for example, a large disk storage unit and/or use a tape backup unit. In conventional systems the operation copy 1825 corresponds copying database blocks in the database 1810 or to exporting the data in the database 1810 to one or more files, copying the files to the backup system 1815 to be stored in the data store 1820. Some of the database systems 1810 may store snapshots of the databases on the system that also need to be backed up. A database system 1810 may mirror a database using another database system and synchronize changes in the mirrored database with the original database 1810. The mirror database may need to be backed up into the backup system 1815. In some systems additional standby databases may be used along with a database 1810 to protect the data from failures and disasters. The standby databases may also be backed up using the backup system 1815. An example of a vendor specific utility that helps with backups of databases is RMAN for use with ORACLE databases.

FIG. 18(*b*) illustrates the scenario for restore of databases using a database storage system 1890, replacing the need for traditional backup and recovery. In this embodiment, the database storage system 1890 itself acts as storage for copies of the databases 1860 in the database systems 1865. The copy operation 1825 is obviated by the link and load operation 1830. The advantages of using link and load operations supported by the database storage system 1890 are that it transfers much smaller amount of data from the database 1860 to the database storage system 1890 compared to full and incremental backups. Furthermore, subsequent updates of databases 1860 performed using the link and load 1830 operations transfer only the changes that occur in the databases 1860 on an ongoing basis, without the need to repeat a full load. As a result, the amount of data transferred from the databases 1860 to the storage system data store 1840 is significantly smaller than in a backup solution. Therefore, much less storage space is occupied by the data in the storage system data store 1840 and the transfer of data from the databases 1860 to the storage system data store 1840 requires much less time.

In another embodiment, the data available in the storage system data store 1840 is backed up 1855 using a backup system 1845. The backup operation 1855 may initially copy the entire data available in the storage system data store 1840 and subsequently copy 1855 incremental changes of the data stored in the storage system data store 1840. The amount of data stored in the storage system data store 1840 can be significantly less than the amount of data stored by the data store 1820 of the backup system 1815 since only changes made to the databases 1860 are stored in the storage system data store 1840. Hence the time required to link/load the data in databases 1860 to the storage system data store 1840 combined with the time taken to backup 1855 the data of storage system data store 1840 can be significantly less than the time taken by the backup operations 1825 in a large enterprise, especially when it comes to the load and time required from the source databases.

Maintaining Database Replicas

In several workflow scenarios, information in a source database is periodically copied to a target database. For example, information may be copied from a source database to a target database used for recovery of information in case the source database is destroyed in a disaster (the process known as disaster recovery). Information may also be copied to one or more databases to increase the availability of the data to users. For example, if the source database is down for maintenance or for other reasons, the target database can be made available to the users. In some usage scenarios, information is copied from a source database to a target database that is used for reporting purposes. The execution of reports on a production database system may cause significant load on a database. Since the production database system is used for transaction processing, it is preferred that a different server synchronized with the database on the production database system be used for generating reports. The target database is updated frequently to provide up-to-date reports using the reporting infrastructure. Another scenario that requires copy of information from a source database to a target database is the migration of databases from one machine to another. Migration of databases may be required when an enterprise upgrades software to newer versions, for example, upgrades to a newer version of operating system, a newer version of database management system, a newer version of an application, or upgrade to new hardware. Migration of databases may also be required from one physical location to another, for example, when a company is acquired by another company.

Figure 19:
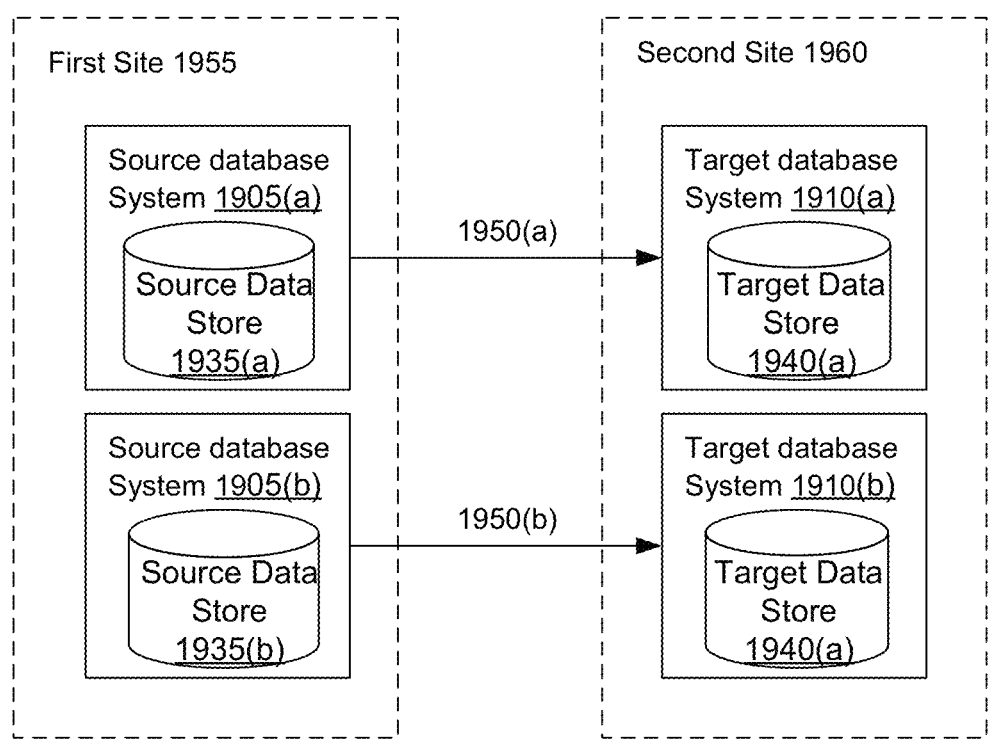
FIG. 19 illustrates a system environment for implementing a workflow for a generic scenario that requires copying of information in a database from one machine to another machine using conventional methods.

FIG. 19 illustrates a system environment for copying information from one or more source database systems 1905 to target database systems 1905. FIG. 19 illustrates the copy or transfer 1950 of information from a source data store 1935 in a source database system 1905 to a target data store 1940 in a target database system 1910. In other embodiments, information from one source data store 1935 may be transferred to more than one target data store 1940. Alternatively, information in more than one source data store 1935 may be transferred 1950 to a single target data store 1940.

Various parameters related to the copy 1950 operation including the rate of transfer, frequency of transfer, type of information being transferred may depend on the specific scenario. The source database systems 1905 and the target databases 1910 may be situated in different physical locations, for example, geographically separate locations illustrated as the first site 1955 and the second site 1960. Typically machines situated in different physical locations have slow network communication compared to machines situated in the same physical location. Embodiments described herein apply to source and target database systems situated in the same physical location as well as different locations.

Figure 20:
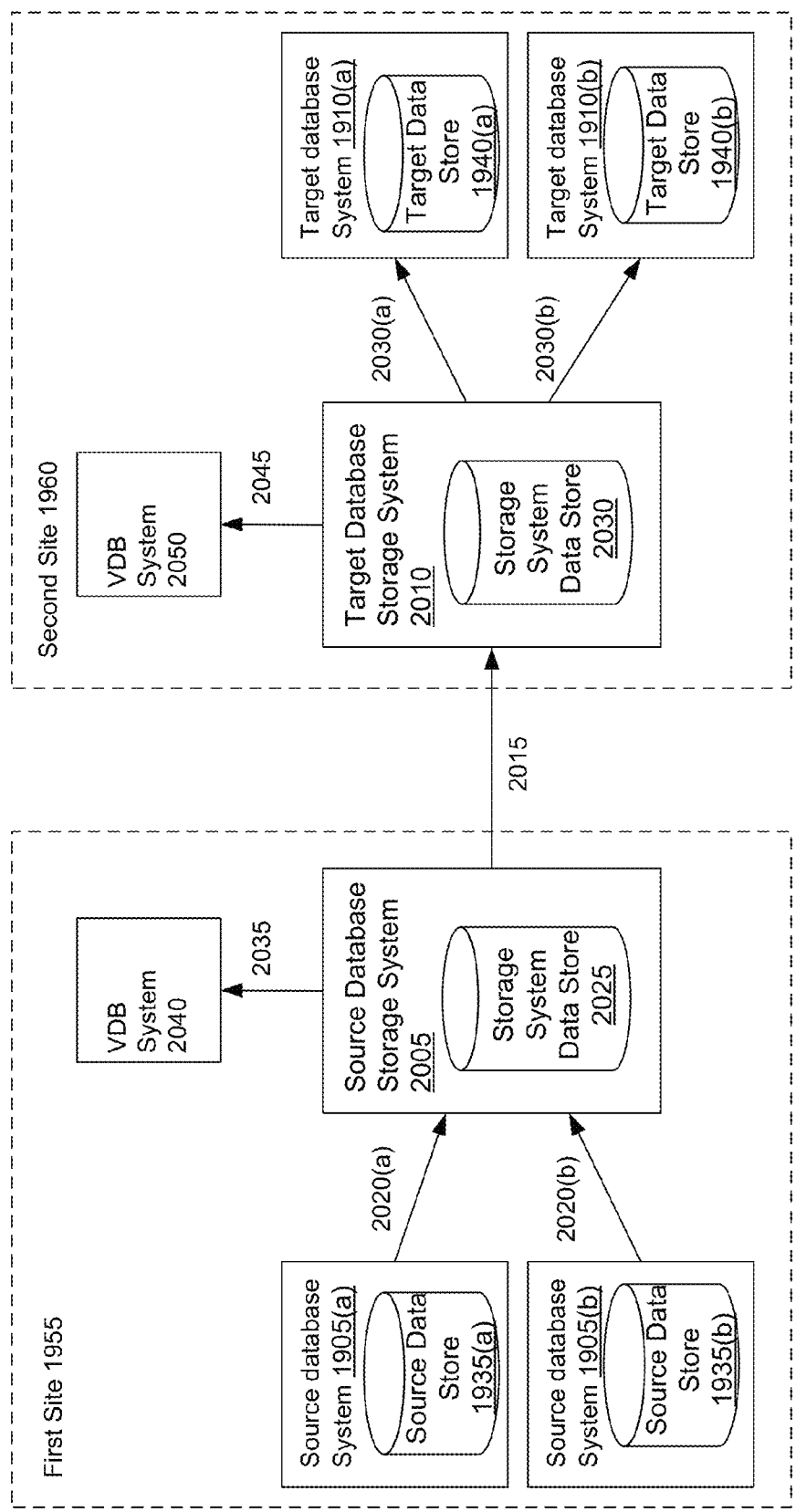
FIG. 20 illustrates a system environment for implementing a workflow based on VDBs for a generic scenario that requires copying of information in a database from one machine to another machine, in accordance with an embodiment of the invention.

FIG. 20 illustrates a system environment based on virtual databases stored in database storage systems 100 for implementing a workflow scenario conventionally implemented as shown in FIG. 19. As shown in FIG. 20, the data in the databases stored in source data stores 1935 is linked and loaded 2020 to the storage system data store 2025 of the source database storage system 2005. The operation 2020 may include subsequent load operations performed to update the data in the storage system data store 2025 based on updates in the source database system 1905. The data in the storage system data store 2025 of the source database storage system 2005 is transmitted 2015 to the storage system data store 2030 of the target database storage system 2010. The operation 2015 may be a copy operation that copies the entire information in the storage system data store, a backup operation, or a replicate operation that incrementally copies updates in storage system data store 2025 to the storage system data store 2030.

In the scenario of migration of databases, the operation 2015 may copy the entire data in the storage system data store 2025. In the scenario of replication, the changes in the storage system data store 2025 may be copied periodically to the storage system data store 2030. The changes to storage system data store 2030 may be applied to VDBs provisioned to target database systems 1910 using the refresh operations. If any changes are made to the VDBs by the target database system 1910, the changes may be propagated back to the storage system data store 2025.

The operation 2030 makes databases stored in the storage system data store 2030 available to target database systems 1910. In the scenario of high-availability systems, the operation 2030 may correspond to provisioning a VDB from the storage system data store 2030 to target database systems 1910. In the scenario of disaster recovery, the operation 2030 may correspond to exporting a database to the target database systems 1910. As shown in FIG. 20, there can be VDBs provisioned 2035 by the source database storage system 2005 to VDB systems 2040. Equivalent VDBs can be created using the data in the target database storage system 2010 and provisioned 2045 to VDB systems 2050. Any changes made to the VDBs in the source database storage system 2005 are automatically saved in the storage system data store 2025 and get propagated to the target database storage system 2010 by the transfer operation 2015.

In one embodiment, the target database storage system 2010 may have all the modules illustrated in FIG. 3 prior to the operation 2015. In another embodiment, a machine that does not have the modules of a database storage system shown in FIG. 3 may be provided for use as the target database storage system 2010. For example, a uses may provide a new machine that does not have all the necessary software installed on it to act as a database storage system 100. In this embodiment, the operation 2015 copies the program code that implements the modules of a database storage system to the target machine along with the data stored in the storage system data store 2025. The program code copied to the target machine is installed and prepared for execution. Accordingly, the machine provided for use as the target database storage system 2010 is prepared to execute the modules of a database storage system 100. After the data associated with database stored in the storage system data store 2025 is copied to the storage system data store 2030, the target database storage system 2010 can perform VDB related operations, for example, creating a virtual database or provisioning 2045 a virtual database to a VDB system 2050.

Figure 21:
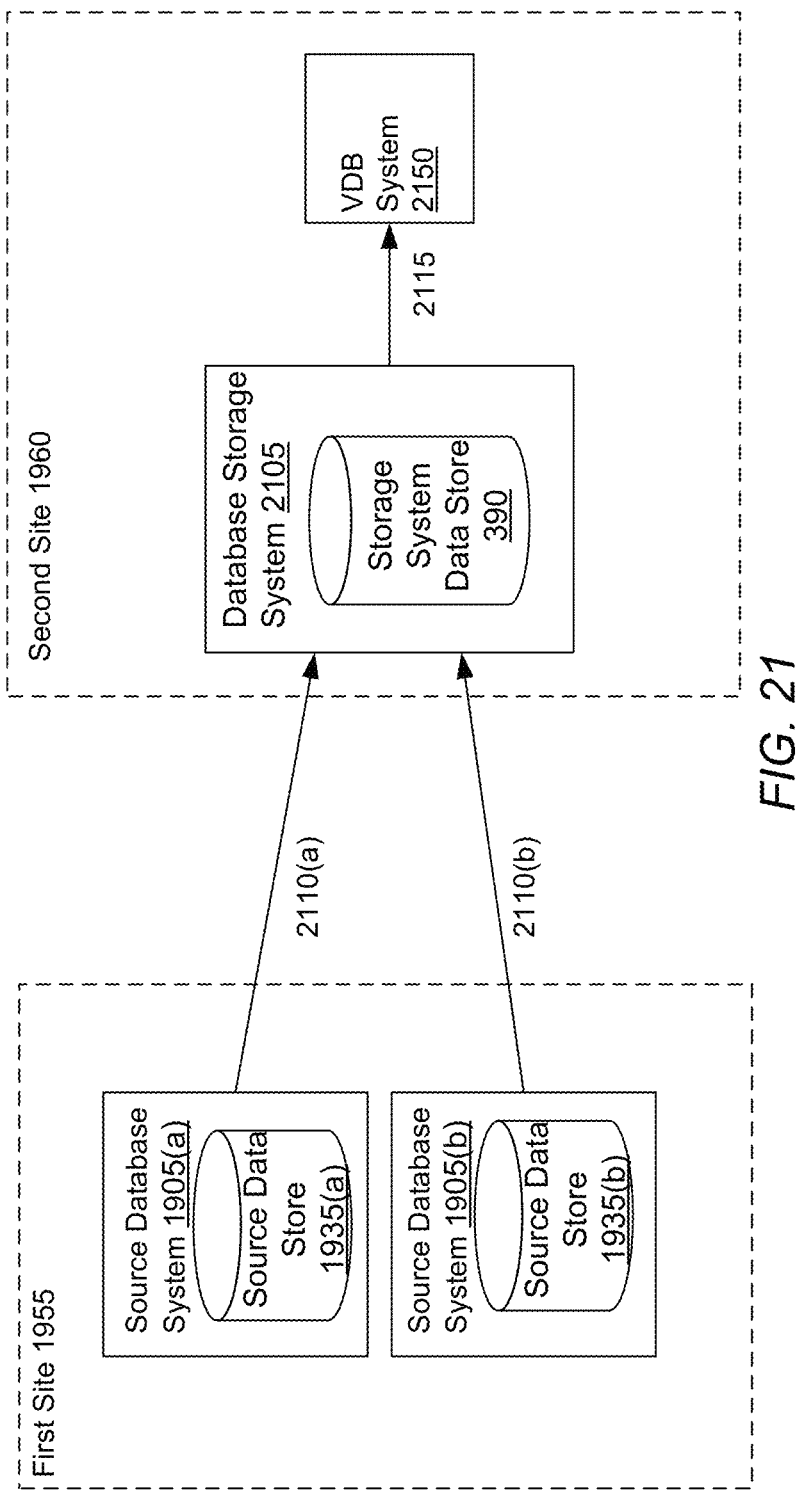
FIG. 21 illustrates a system environment for implementing a workflow based on VDBs for a scenario that requires copying of information in a database from one machine to another machine, in accordance with another embodiment of the invention.

FIG. 21 illustrates another embodiment of a system environment based on database storage systems 100 for implementing a workflow scenario conventionally implemented as shown in FIG. 19. The source database systems 1905 are directly linked and loaded 2110 into the database storage system 2105. As illustrated in FIG. 21, the database storage system 2105 may be available in a different site 1960 or physical location as the site 1955 storing the source databases or the two systems may be in the same site. The changes to the source data store 1935 of the source database systems 1905 are loaded 2110 to the database storage system 2105 periodically. The database storage system 2105 acts as the copy of the databases in source data stores 1935 that can be used for disaster recovery. Virtual databases can be created in the database storage system 2105 and provisioned for availability to the VDB system 2150.

In an embodiment, the database storage system 2105 can also be used in a high availability scenario where it acts as a standby system that can be used when the source database system 1905 is down. The database storage system 2105 acts as a standby database by creating a VDB and provisioning 2115 the created VDB to the VDB system 2150. The VDB system 2150 can acts as the standby database when the corresponding source database system 1905 is down. The database request that were processed by the source database system 1905 can be processed by the VDB system 2150 while the source database system 1905 is down. When the source database system 1905 is ready to process requests, the changes made to the VDB by the VDB system 2150 are exported to the source storage system. After applying the changes from the VDB system 2150 to the source database system 1935, the database requests can be diverted back to the source database system 1905.

Figure 22:
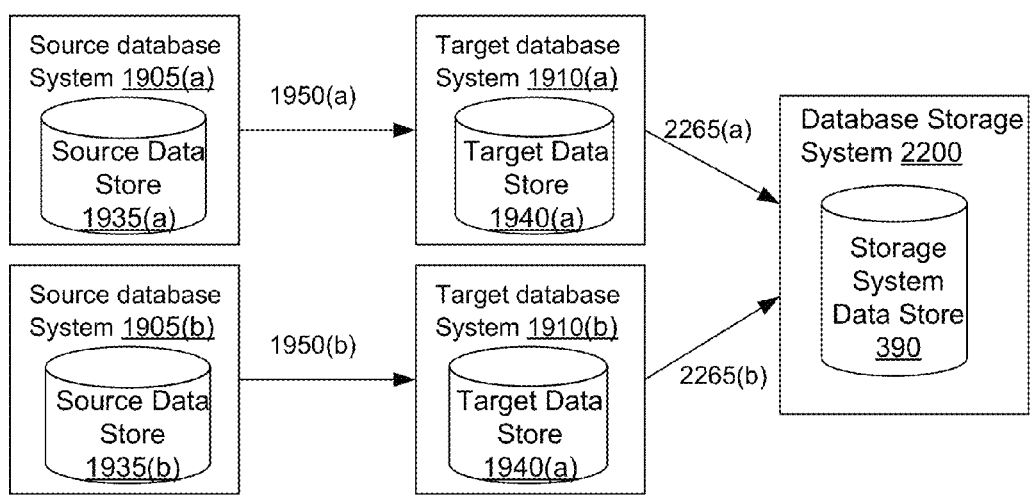
FIG. 22 illustrates a system environment for implementing a workflow based on VDBs for a generic scenario that requires copying of information in a database from a machine different from the production database system to another machine, in accordance with an embodiment of the invention.

FIG. 22 illustrates another embodiment of a system environment based on data storage systems for implementing a workflow scenario conventionally implemented as shown in FIG. 19. In some enterprises, there may be existing systems that replicate data from source database systems 1905 to target database systems 1910. Accordingly, it may not be necessary to link and load the data to a database storage system 2200 directly from the source database system 1905 as illustrated in FIG. 21. As shown in the FIG. 22, the link load 2265 operation can be performed using the information available in the target database systems 1910 to which information form source database systems 1905 is being copied. Linking and loading the data from the database storage system may result in load on the source database system 1905 that can be avoided by retrieving the appropriate information from the mirror systems, for example, the target database systems 1910. This leaves the source storage systems 1905 undisturbed while providing the necessary information to the database storage system 2200.

Workflow for Managing a Data Warehouse

Figure 23:
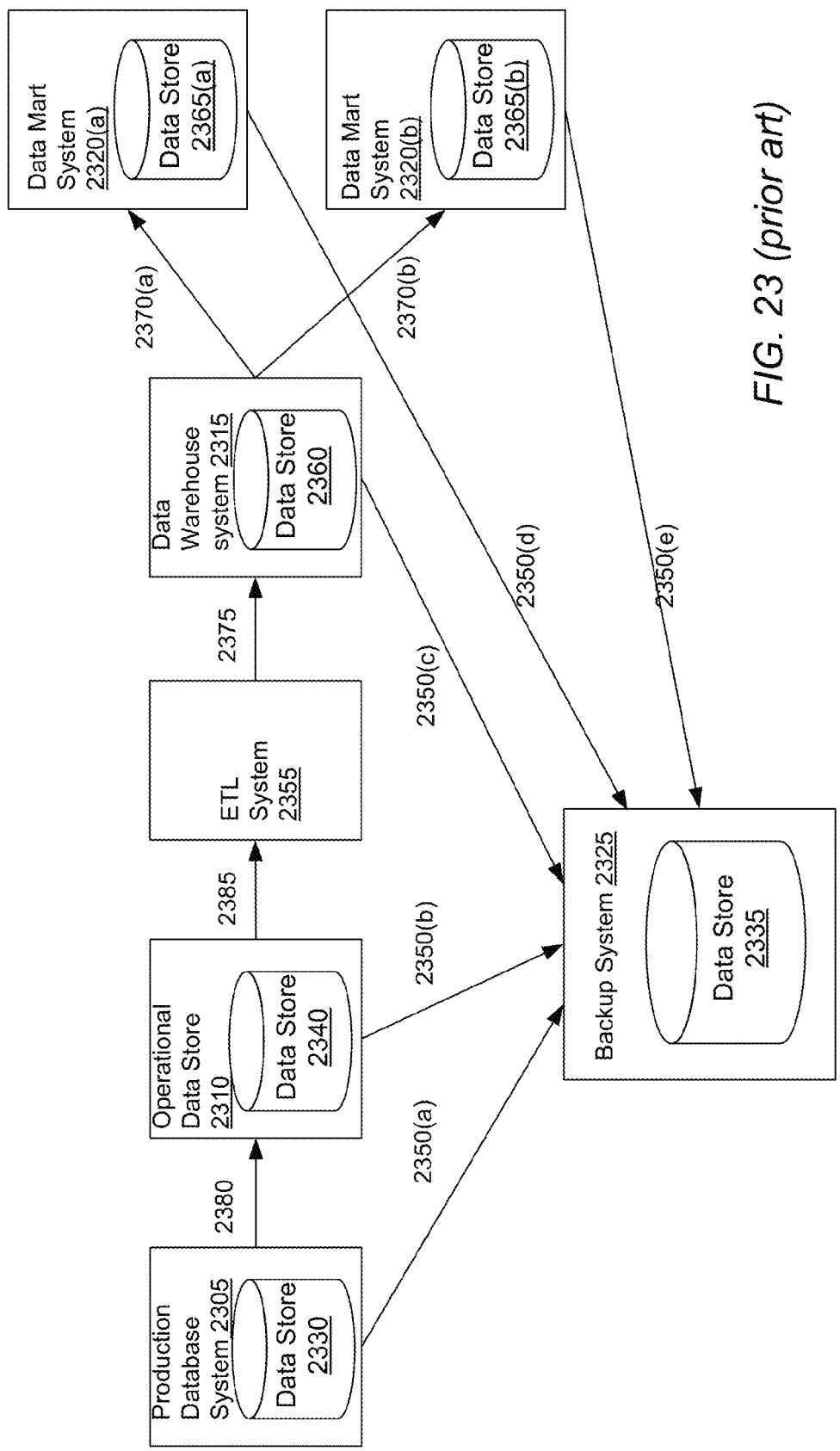
FIG. 23 illustrates a system environment for implementing a workflow for a scenario for creating data warehouse and data marts from a database using conventional methods.

FIG. 23 illustrates a system environment for creating a data warehouse and data marts using data available in databases. The production database system 2305 contains the latest information based on transactions in one or more databases stored in the data store 2330. Information from one or more production database systems 2305 may be assimilated 2380 into the data store 2340 of an operational data store 2310 for analysis purposes. The data in the operational data store 2310 is further processed 2385 by an extract transform and load (ETL) system 2355. The data processed by the ETL system 2355 is sent 2375 to the data warehouse system 2315. The ETL system 2355 may temporarily store the data for processing. The processing performed by the ETL system 2355 allows the data to be stored in the data store 2360 of the data warehouse system 2315 in specific format useful for reporting and analysis operations specific to a data warehouse system 2315. Subsets of data stored in the data store 2360 may be computed 2370 for storage in data stores 2365 of data mart systems 2320 intended for analysis of the subsets of data for specific purposes. Since data is stored in data stores of several systems described above, the data may be backed up 2350 using a backup system 2325 and stored in a backup data store 2335. The above process may maintain multiple copies of the same data in different systems even though the data may not have changed. Besides, several different computer systems are used for storing the data, thereby resulting in inefficient utilization of resources.

Figure 24:
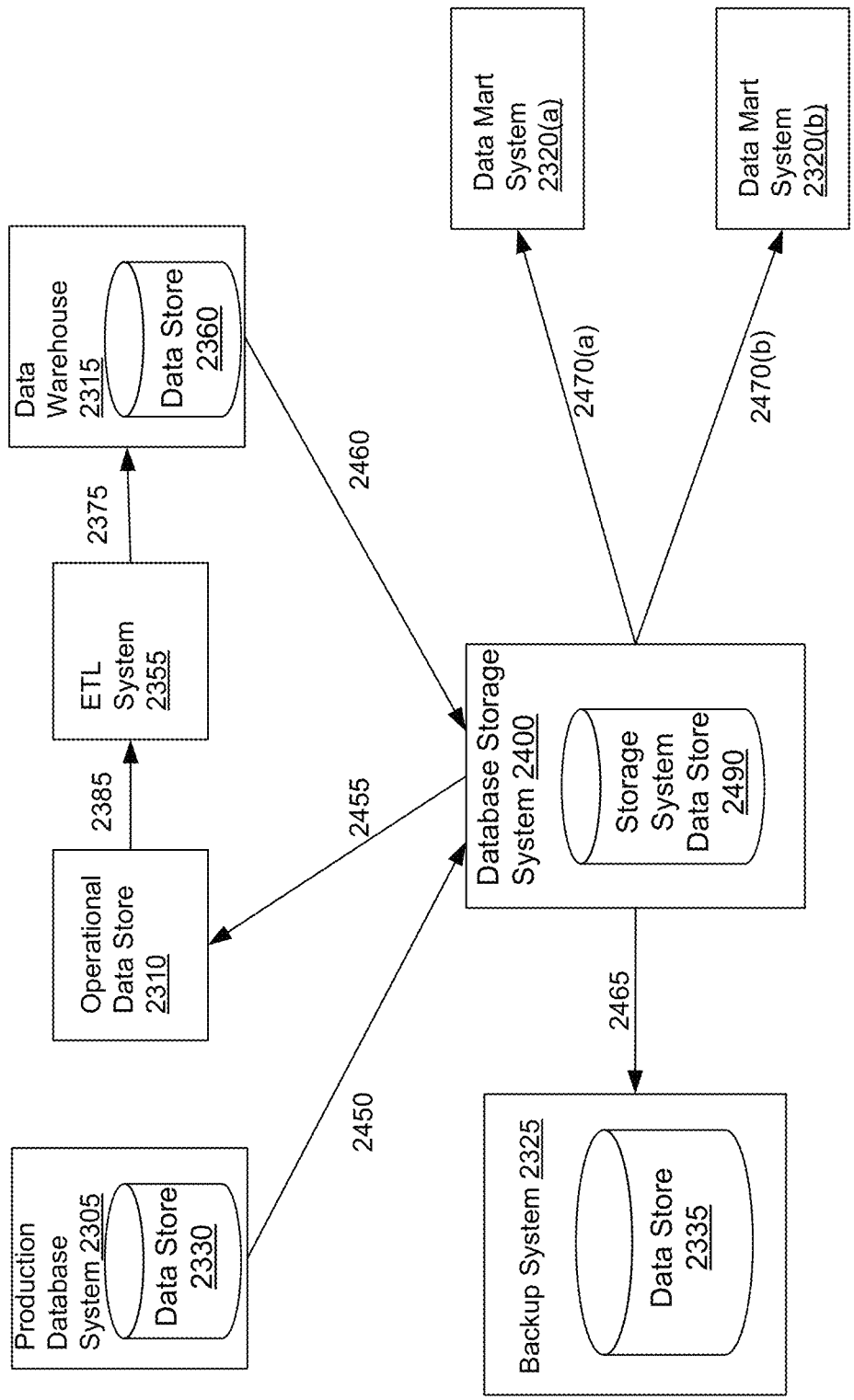
FIG. 24 illustrates a system environment based on VDBs for implementing a workflow for a scenario for creating data warehouse and data marts from a database, in accordance with an embodiment of the invention.

FIG. 24 illustrates an embodiment of a system environment based on a database storage system 100 for implementing a workflow scenario conventionally implemented as shown in FIG. 23. The databases in the data store 2330 of the production database system 2305 are linked and loaded 2450 to the database storage system 2400. After the initial load operation 2450, subsequent loads 2450 only transfer data that has changed in the corresponding databases in the data store 2330. A virtual database can be created and provisioned 2455 for use as the operational data store 2310. The ETL system 2355 processes 2385 the data obtained from the VDB associated with the operational data store 2310 and sends 2375 the processed data to the data warehouse system 2315. The data stored in the data store 2360 of the data warehouse 2315 is linked and loaded 2460 to the database storage system 2400. The database storage system 2400 can create VDBs and provision 2470 them by for use by data mart systems 2320. Systems including the operational data store 2310, ETL system 2355, and data mart systems 2320 may not need to store the corresponding databases locally and can utilize the storage system data store 2490 for storing the databases. Furthermore, the process of backing up the various databases in the above workflow is achieved by backing up 2465 the storage system data store 2490 to the data store 2335 of the backup system 2325. As described in the workflow scenario of backup in FIG. 18, the backup performed using the database storage system 2400 as shown in FIG. 24 can be more efficient compared to individual backups performed by various systems as shown in FIG. 23. The backup of storage system data store 2490 is efficient because the amount of data being backed up can be significantly less since the storage system data store 2490 efficiently stores copies of data and also because transferring data from a single system can be more efficient than transferring data from multiple systems.

Computing Machine Architecture

Figure 25:
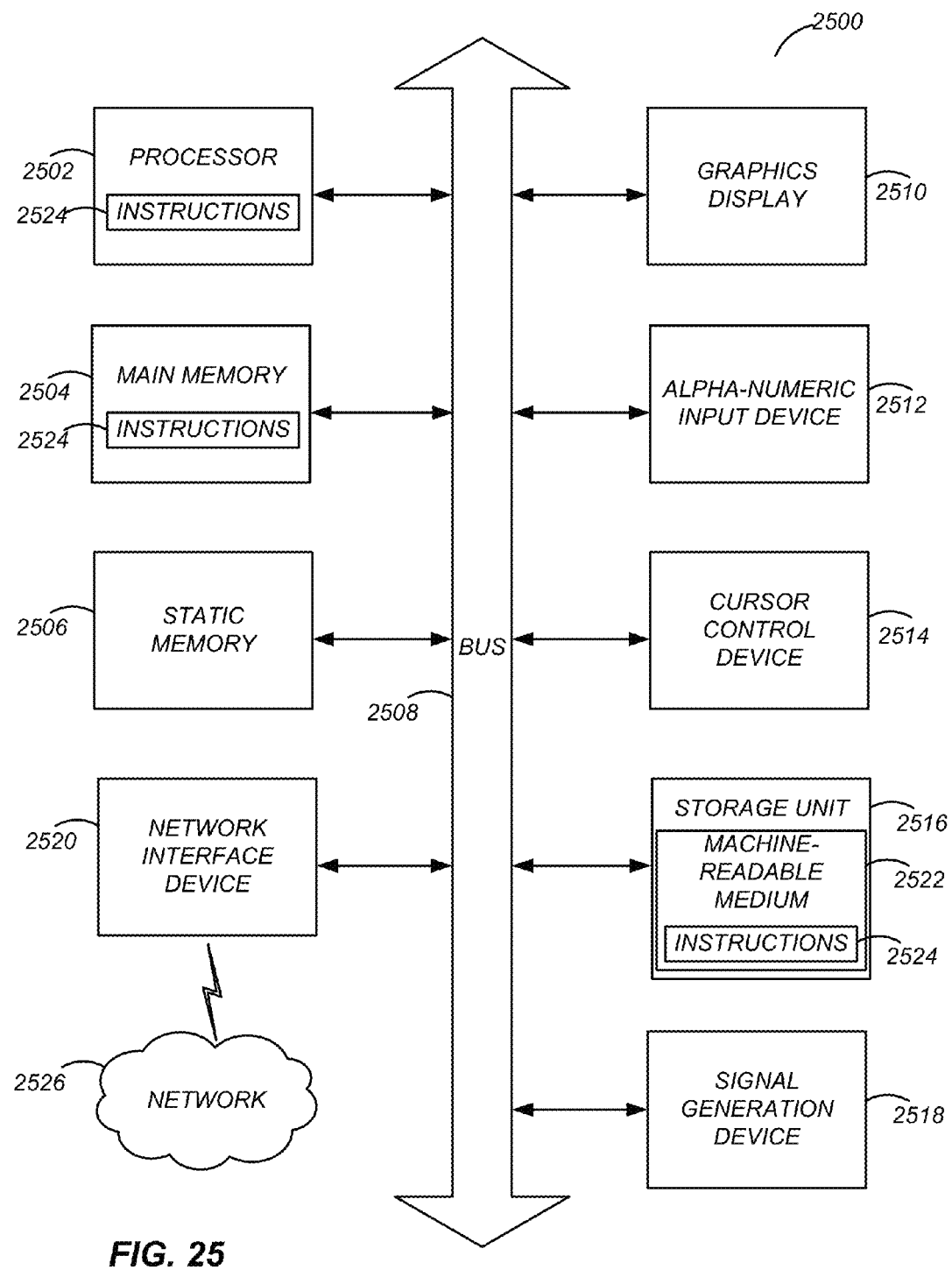
FIG. 25 illustrates an embodiment of a computing machine that can read instructions from a machine-readable medium and execute the instructions in a processor or controller.

FIG. 25 is a block diagram illustrating components of an example machine able to read instructions from a machine-readable medium and execute them in a processor (or controller). Specifically, FIG. 25 shows a diagrammatic representation of a machine in the example form of a computer system 2500 within which instructions 2524 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 2524 (sequential or otherwise) that specify actions to be taken by that machine. Further, while only a single machine is illustrated, the term "machine" shall also be taken to include any collection of machines that individually or jointly execute instructions 2524 to perform any one or more of the methodologies discussed herein.

The example computer system 2500 includes a processor 2502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 2504, and a static memory 2506, which are configured to communicate with each other via a bus 2508. The computer system 2500 may further include graphics display unit 2510 (e.g., a plasma display panel (PDP), a liquid crystal display (LCD), a projector, or a cathode ray tube (CRT)). The computer system 2500 may also include alphanumeric input device 2512 (e.g., a keyboard), a cursor control device 2514 (e.g., a mouse, a trackball, a joystick, a motion sensor, or other pointing instrument), a storage unit 2516, a signal generation device 2518 (e.g., a speaker), and a network interface device 2520, which also are configured to communicate via the bus 2508.

The storage unit 2516 includes a machine-readable medium 2522 on which is stored instructions 2524 (e.g., software) embodying any one or more of the methodologies or functions described herein. The instructions 2524 (e.g., software) may also reside, completely or at least partially, within the main memory 2504 or within the processor 2502 (e.g., within a processor's cache memory) during execution thereof by the computer system 2500, the main memory 2504 and the processor 2502 also constituting machine-readable media. The instructions 2524 (e.g., software) may be transmitted or received over a network 2526 via the network interface device 2520.

While machine-readable medium 2522 is shown in an example embodiment to be a single medium, the term "machine-readable medium" should be taken to include a single medium or multiple media (e.g., a centralized or distributed database, or associated caches and servers) able to store instructions (e.g., instructions 2524). The term "machine-readable medium" shall also be taken to include any medium that is capable of storing instructions (e.g., instructions 2524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and processes for datacenter workflow automation scenarios using virtual databases created from point-in-time copies of production databases and stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for replicating a database, the method comprising:
    receiving, by a first storage system, database blocks for different point-in-time copies of a source database;
    storing, by the first storage system, point-in-time copies of the source database, wherein a point-in-time copy shares one or more stored database blocks with one or more other point-in time-copies;
    creating, by the first storage system, a first virtual database comprising database blocks stored on the first storage system, the virtual database sharing one or more database blocks with other virtual databases of the first storage system;
    providing, by the first storage system, access to the first virtual database to a first database server;
    replicating, by the first storage system, the database blocks from the first storage system to a second storage system;
    creating, by the second storage system, a second virtual database comprising database blocks stored on the second storage system, the second virtual database matching data of the first virtual database, the second virtual database sharing one or more database blocks with other virtual databases of the second storage system;
    receiving, by the first storage system, modifications to the first virtual database from the first database server;
    sending, by the first storage system, information describing changes to the first virtual database to the second storage system; and
    refreshing, by the second storage system, the second virtual database, such that the data of the second virtual database matches the data of the first virtual database.

2. The method of claim 1, wherein replicating database blocks from the first storage system to the second storage system comprises incrementally copying updates in the first storage system to the second storage system.

3. The method of claim 1, wherein creating the first virtual database comprises:
    creating a first set of files, each file in the first set of files linked to the database blocks on the first storage system associated with a point-in-time copy of the source database; and
    mounting the first set of files associated with the first virtual database on the first database server.

4. The method of claim 1, further comprising:
    providing access to the second virtual database to a second database server;
    receiving modifications to the second virtual database from the second database server; and
    sending information describing changes to the second virtual database to the first storage system.

5. The method of claim 1, wherein creating the second virtual database comprises:
    creating a second set of files, each file in the second set of files linked to the database blocks on the second storage system associated with a point-in-time copy of the source database; and
    mounting the second set of files associated with the second virtual database on a second database server.

6. The method of claim 1, further comprising:
    copying program code to the second storage system, the program code comprising one or more software modules configured to create virtual databases.

7. The method of claim 1, wherein refreshing the second virtual database comprises:
    shutting down the second virtual database;
    updating data of the second virtual database based on the updates of the first virtual database; and
    restarting the virtual database.

8. The method of claim 1, further comprising:
    receiving, by the first storage system, information describing transaction logs from the source database wherein the transaction logs represent changes to the source database since a previous point-in-time copy was received; and
    wherein creating the first virtual database comprises applying the transaction logs to database blocks of a point-in-time copy associated with the first virtual database.

9. The method of claim 1, wherein receiving point-in-time copies comprises receiving data streams corresponding to the point-in-time copies, wherein each data stream comprises data from database blocks associated with the source database.

10. The method of claim 9, further comprising:
    analyzing the data streams received to identify database blocks; and
    storing the identified database blocks.

11. The method of claim 9, further comprising:
    analyzing the data streams received to identify database blocks and analyzing metadata of database blocks to determine a length of the database blocks for processing the data stream.

12. The method of claim 11, further comprising:
    analyzing metadata of database blocks to determine whether to store the identified database block.

13. The method of claim 12, further comprising:
determining not to store the database blocks that are identified as one of temporary database blocks, empty database blocks, or database blocks that did not change since a previous retrieval of point-in-time copy of the source database.

14. A computer readable non-transitory storage medium, storing instructions for:
receiving, by a first storage system, database blocks for different point-in-time copies of a source database;
storing, by the first storage system, point-in-time copies of the source database, wherein a point-in-time copy shares one or more stored database blocks with one or more other point-in time-copies;
creating, by the first storage system, a first virtual database comprising database blocks stored on the first storage system, the virtual database sharing one or more database blocks with other virtual databases of the first storage system;
providing, by the first storage system, access to the first virtual database to a first database server;
replicating, by the first storage system, the database blocks from the first storage system to a second storage system;
creating, by the second storage system, a second virtual database comprising database blocks stored on the second storage system, the second virtual database matching data of the first virtual database, the second virtual database sharing one or more database blocks with other virtual databases of the second storage system;
receiving, by the first storage system, modifications to the first virtual database from the first database server;
sending, by the first storage system, information describing changes to the first virtual database to the second storage system; and
refreshing, by the second storage system, the second virtual database, such that the data of the second virtual matches the data of the first virtual database.

15. The computer readable non-transitory storage medium of claim 14, wherein replicating database blocks from the first storage system to the second storage system comprises incrementally copying updates in the first storage system to the second storage system.

16. The computer readable non-transitory storage medium of claim 14, wherein creating the first virtual database comprises:
creating a first set of files, each file in the first set of files linked to the database blocks on the first storage system associated with a point-in-time copy of the source database; and
mounting the first set of files associated with the first virtual database on the first database server.

17. The computer readable non-transitory storage medium of claim 14, further comprising:
providing access to the second virtual database to a second database server;
receiving modifications to the second virtual database from the second database server; and
sending information describing changes to the second virtual database to the first storage system.

18. The computer readable non-transitory storage medium of claim 14, further comprising:
copying program code to the second storage system, the program code comprising one or more software modules configured to create virtual databases.

19. The computer readable non-transitory storage medium of claim 14, wherein refreshing the second virtual database comprises:
shutting down the second virtual database;
updating data of the second virtual database based on the updates of the first virtual database; and
restarting the virtual database.

20. A computer-implemented system comprising:
a computer processor; and
a computer-readable non-transitory storage medium storing instructions for:
receiving, by a first storage system, database blocks for different point-in-time copies of a source database;
storing, by the first storage system, point-in-time copies of the source database, wherein a point-in-time copy shares one or more stored database blocks with one or more other point-in time-copies;
creating, by the first storage system, a first virtual database comprising database blocks stored on the first storage system, the virtual database sharing one or more database blocks with other virtual databases of the first storage system;
providing, by the first storage system, access to the first virtual database to a first database server;
replicating, by the first storage system, the database blocks from the first storage system to a second storage system;
creating, by the second storage system, a second virtual database comprising database blocks stored on the second storage system, the second virtual database matching data of the first virtual database, the second virtual database sharing one or more database blocks with other virtual databases of the second storage system;
receiving, by the first storage system, modifications to the first virtual database from the first database server;
sending, by the first storage system, information describing changes to the first virtual database to the second storage system; and
refreshing, by the second storage system, the second virtual database, such that the data of the second virtual matches the data of the first virtual database.

* * * * *